United States Patent [19]
Fujisawa et al.

[11] Patent Number: 5,339,171
[45] Date of Patent: Aug. 16, 1994

[54] IMAGE PROCESSING APPARATUS ESPECIALLY SUITABLE FOR PRODUCING SMOOTH-EDGED OUTPUT MULTI-LEVEL TONE DATA HAVING FEWER LEVELS THAN INPUT MULTI-LEVEL TONE DATA

[75] Inventors: Tetsuo Fujisawa, Urawa; Yukio Sakano, Fuchuu, both of Japan

[73] Assignee: Ricoh Company, Ltd., Tokyo, Japan

[21] Appl. No.: 893,094

[22] Filed: Jun. 4, 1992

Related U.S. Application Data

[63] Continuation-in-part of Ser. No. 687,572, Apr. 19, 1991.

[30] Foreign Application Priority Data

| Apr. 24, 1990 | [JP] | Japan | 2-106490 |
| Apr. 24, 1990 | [JP] | Japan | 2-106491 |
| Jan. 11, 1991 | [JP] | Japan | 3-012539 |
| Jun. 5, 1991 | [JP] | Japan | 3-133895 |

[51] Int. Cl.$^5$ ............ H04N 1/40; H04N 1/21; G06K 9/38
[52] U.S. Cl. ............ 358/458; 358/455; 358/456; 358/457; 358/466; 358/298; 382/50
[58] Field of Search ............ 358/455, 456, 457, 466, 358/298; 382/50

[56] References Cited

U.S. PATENT DOCUMENTS

| 4,821,334 | 4/1989 | Ogino et al. | 382/50 |
| 4,937,677 | 6/1990 | van Dorsselaer | 358/456 |
| 4,958,238 | 7/1990 | Katayama et al. | 358/455 |
| 4,969,052 | 11/1990 | Ishida et al. | 358/457 |
| 5,086,484 | 2/1992 | Katayama et al. | 382/50 |
| 5,153,925 | 10/1992 | Tanioka et al. | 382/50 |
| 5,177,623 | 1/1993 | Hirota | 358/457 |
| 5,220,616 | 6/1993 | Downing et al. | 358/457 |

OTHER PUBLICATIONS

Kotera, H., "Digital Halftoning", *Institute of Television Engineers of Japan*, vol. 40, No. 4, 1986, pp. 317–323.

*Primary Examiner*—Edward L. Coles, Sr.
*Assistant Examiner*—Kimberly A. Williams
*Attorney, Agent, or Firm*—Mason, Fenwick & Lawrence

[57] ABSTRACT

An image processing apparatus includes a scanner for inputting image data indicative of an image with a multilevel tone, a multilevel data part for generating multilevel tone data from the input image data through a prescribed error diffusion process, the multilevel data part outputting image data having pixels to which the multilevel tone data is assigned, a storage part for temporarily storing a value of one of two successive pixels included in the image data, and a two-pixel processing part for converting the value of the one pixel stored in the storage part into a first value, and for generating second values of the two successive pixels using the first value of the one pixel, so that output image data is output to a printer, each pixel of the output image data being described by the second values of the two successive pixels.

15 Claims, 26 Drawing Sheets

FIG. 7

| ADDRESS | DATA | |
|---|---|---|
| SD+G₁ | ID₂ | G₂ |
| 0 | 0 | 0 |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 0 | 9 |
| 10 | 0 | 10 |
| 11 | 0 | 11 |
| 12 | 0 | 12 |
| 13 | 0 | 13 |
| 14 | 0 | 14 |
| 15 | 0 | 15 |
| 16 | 0 | 16 |
| 17 | 0 | 17 |
| 18 | 0 | 18 |
| 19 | 0 | 19 |
| 20 | 0 | 20 |
| 21 | 0 | 21 |
| 22 | 0 | 22 |
| 23 | 0 | 23 |

| ADDRESS | DATA | |
|---|---|---|
| SD+G₁ | ID₂ | G₂ |
| 50 | 1 | 18 |
| 51 | 1 | 19 |
| 52 | 1 | 20 |
| 53 | 1 | 21 |
| 54 | 1 | 22 |
| 55 | 1 | 23 |
| 56 | 1 | 24 |
| 57 | 1 | 25 |
| 58 | 1 | 26 |
| 59 | 1 | 27 |
| 60 | 1 | 28 |
| 61 | 1 | 29 |
| 62 | 1 | 30 |
| 63 | 1 | 31 |
| 64 | 2 | 0 |
| 65 | 2 | 1 |
| 66 | 2 | 2 |
| 67 | 2 | 3 |
| 68 | 2 | 4 |
| 69 | 2 | 5 |
| 70 | 2 | 6 |
| 71 | 2 | 7 |
| 72 | 2 | 8 |
| 73 | 2 | 9 |

| ADDRESS | DATA | |
|---|---|---|
| SD+G₁ | ID₂ | G₂ |
| 100 | 3 | 4 |
| 101 | 3 | 5 |
| 102 | 3 | 6 |
| 103 | 3 | 7 |
| 104 | 3 | 8 |
| 105 | 3 | 9 |
| 106 | 3 | 10 |
| 107 | 3 | 11 |
| 108 | 3 | 12 |
| 109 | 3 | 13 |
| 110 | 3 | 14 |
| 111 | 3 | 15 |
| 112 | 3 | 16 |
| 113 | 3 | 17 |
| 114 | 3 | 18 |
| 115 | 3 | 19 |
| 116 | 3 | 20 |
| 117 | 3 | 21 |
| 118 | 3 | 22 |
| 119 | 3 | 23 |
| 120 | 3 | 24 |
| 121 | 3 | 25 |
| 122 | 3 | 26 |
| 123 | 3 | 27 |

| ADDRESS | DATA | |
|---|---|---|
| SD+G₁ | ID₂ | G₂ |
| 150 | 4 | 22 |
| 151 | 4 | 23 |
| 152 | 4 | 24 |
| 153 | 4 | 25 |
| 154 | 4 | 26 |
| 155 | 4 | 27 |
| 156 | 4 | 28 |
| 157 | 4 | 29 |
| 158 | 4 | 30 |
| 159 | 4 | 31 |

FIG. 7 (CONT.)

| | | | | | | | | | | | | | | | | | | | | | | | |
|---|---|---|---|---|---|---|---|---|---|---|---|---|---|---|---|---|---|---|---|---|---|---|---|
| 28 | 29 | 30 | 31 | 0 | 1 | 2 | 3 | 4 | 5 | 6 | 7 | 8 | 9 | 10 | 11 | 12 | 13 | 14 | 15 | 16 | 17 | 18 | 19 | 20 | 21 |
| 3 | 3 | 3 | 3 | 4 | 4 | 4 | 4 | 4 | 4 | 4 | 4 | 4 | 4 | 4 | 4 | 4 | 4 | 4 | 4 | 4 | 4 | 4 | 4 | 4 | 4 |

| 124 | 125 | 126 | 127 | 128 | 129 | 130 | 131 | 132 | 133 | 134 | 135 | 136 | 137 | 138 | 139 | 140 | 141 | 142 | 143 | 144 | 145 | 146 | 147 | 148 | 149 |

| 0 | 1 | 2 | 3 | 4 | 5 | 6 | 7 | 8 | 9 | 20 | 21 | 22 | 23 | 24 | 25 | 26 | 27 | 28 | 29 | 30 | 31 | 0 | 1 | 2 | 3 |
| 2 | 2 | 2 | 2 | 2 | 2 | 2 | 2 | 2 | 2 | 2 | 2 | 2 | 2 | 2 | 2 | 2 | 2 | 2 | 2 | 2 | 2 | 3 | 3 | 3 | 3 |

| 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 |

| 24 | 25 | 26 | 27 | 28 | 29 | 30 | 31 | 0 | 1 | 2 | 3 | 4 | 5 | 6 | 7 | 8 | 9 | 10 | 11 | 12 | 13 | 14 | 15 | 16 | 17 |
| 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |

| 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |

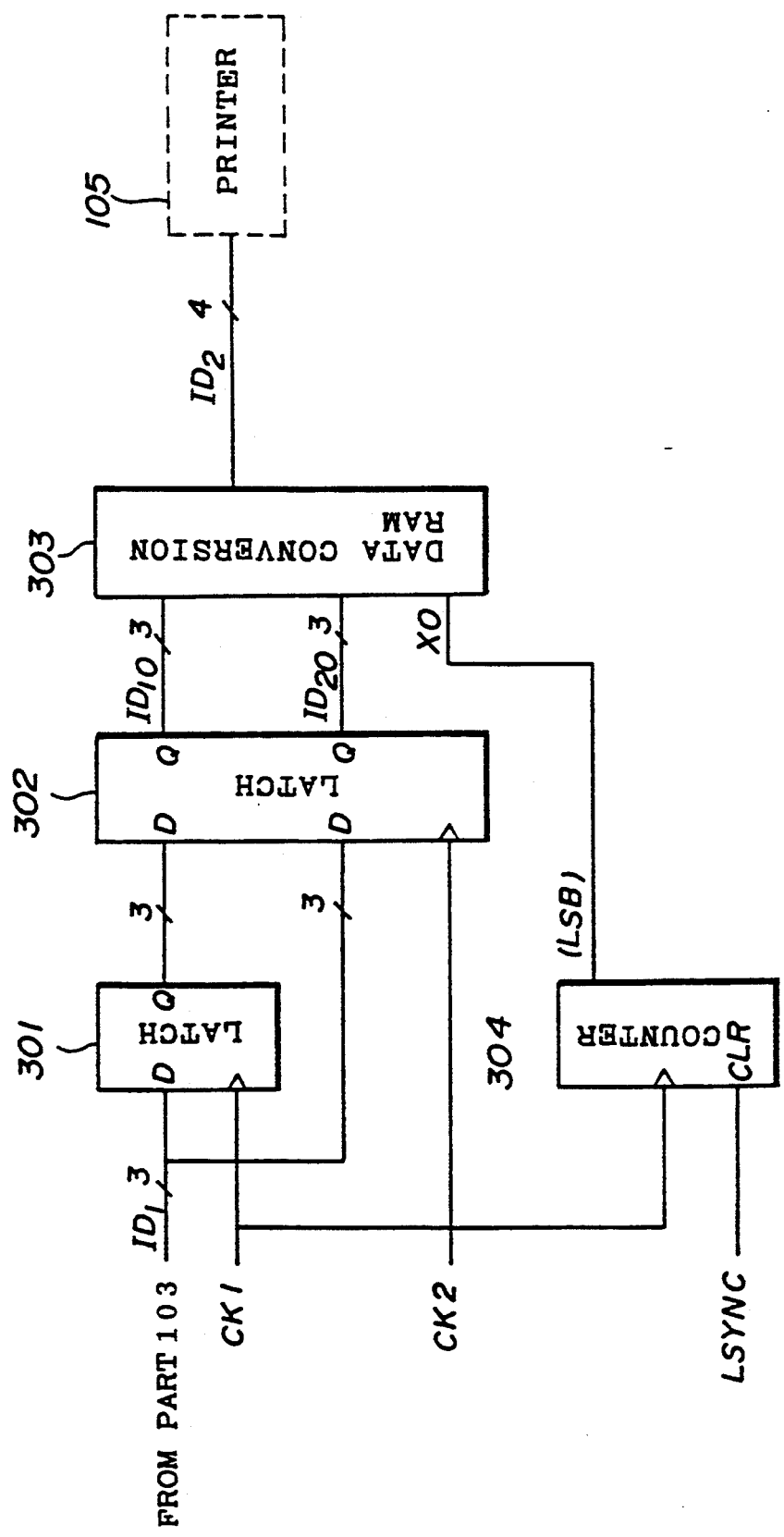

FIG. 10

| ID'$_{10}$ | ID'$_{20}$ | EXPOSURE TIME (ns) |
|---|---|---|
| 0 | 0 | 0 |
| 1 | 0 | 8 |
| 2 | 0 | 16 |
| 3 | 0 | 24 |
| 4 | 0 | 32 |
| 5 | 0 | 40 |
| 6 | 0 | 48 |
| 7 | 0 | 56 |
| 8 | 0 | 64 |
| 9 | 0 | 72 |
| 10 | 0 | 80 |
| 10 | 1 | 88 |
| 10 | 2 | 96 |
| 10 | 3 | 104 |
| 10 | 4 | 112 |
| 10 | 5 | 120 |
| 10 | 6 | 128 |
| 10 | 7 | 136 |
| 10 | 8 | 144 |
| 10 | 9 | 152 |
| 10 | 10 | 160 |

FIG. 9

| ADDRESS | | | DATA |
|---|---|---|---|
| ID$_{10}$ | ID$_{20}$ | X0 | ID$_2$ |
| 0 | 0 | L | 0 |
| 0 | 0 | H | 0 |
| 0 | 1 | L | 1 |
| 0 | 1 | H | 0 |
| 0 | 2 | L | 2 |
| 0 | 2 | H | 0 |
| 0 | 3 | L | 3 |
| 0 | 3 | H | 0 |
| 0 | 4 | L | 4 |
| 0 | 4 | H | 0 |
| 0 | 0 | L | 0 |
| 1 | 0 | H | 1 |
| 1 | 1 | L | 0 |
| 1 | 1 | H | 2 |
| 1 | 2 | L | 0 |
| 1 | 2 | H | 3 |
| 1 | 3 | L | 0 |
| 1 | 3 | H | 4 |
| 1 | 4 | L | 0 |
| 1 | 4 | H | 6 |
| 1 | 0 | L | 0 |
| 2 | 0 | H | 2 |
| 2 | 1 | L | 0 |
| 2 | 1 | H | 3 |
| 2 | 2 | L | 0 |
| 2 | 2 | H | 4 |

| EXPOSURE TIME (ns) | DOT DENSITY |
|---|---|
| 0 | 0.06 |
| 2 | ¦ |
| 4 | ¦ |
| 6 | ¦ |
| 8 | ¦ |
| 10 | ¦ |
| 12 | 0.23 |
| 14 | ¦ |
| 16 | ¦ |
| 18 | ¦ |
| 20 | 0.40 |
| 22 | ¦ |
| 24 | ¦ |
| 26 | ¦ |
| 28 | 0.57 |
| 30 | ¦ |
| 32 | ¦ |
| 34 | ¦ |
| 36 | ¦ |
| 38 | 0.74 |
| 40 | ¦ |
| 42 | ¦ |
| 44 | ¦ |
| 46 | ¦ |
| 48 | 0.91 |
| 50 | ¦ |
| 52 | ¦ |
| 54 | ¦ |
| 56 | ¦ |
| 58 | ¦ |
| 60 | 1.08 |
| 62 | ¦ |
| 64 | ¦ |
| 66 | ¦ |
| 68 | ¦ |
| 70 | ¦ |
| 72 | ¦ |
| 74 | ¦ |
| 76 | ¦ |
| 78 | ¦ |

| EXPOSURE TIME (ns) | DOT DENSITY |
|---|---|
| 80 | 1.25 |
| 82 | ¦ |
| 84 | ¦ |
| 86 | ¦ |
| 88 | ¦ |
| 90 | ¦ |
| 92 | ¦ |
| 94 | ¦ |
| 96 | ¦ |
| 98 | ¦ |
| 100 | ¦ |
| 102 | ¦ |
| 104 | ¦ |
| 106 | ¦ |
| 108 | ¦ |
| 110 | ¦ |
| 112 | 1.42 |

| $ID_{10}+ID_{20}$ | $ID'_{10}$ | $ID'_{20}$ |
|---|---|---|
| 0 | 0 | 0 |
| 1 | 1 | 0 |
| 2 | 2 | 0 |
| 3 | 3 | 0 |
| 4 | 4 | 0 |
| 5 | 6 | 0 |
| 6 | 8 | 0 |
| 7 | 10 | 1 |
| 8 | 10 | 4 |

FIG. 13

| $ID'_{10}$ | $ID'_{20}$ | EXPOSURE TIME (ns) | $ID'_{10}$ | $ID'_{20}$ | EXPOSURE TIME (ns) |
|---|---|---|---|---|---|
| 0 | 0 | 0 | 40 | 0 | 80 |
| 1 | 0 | 2 | 40 | 1 | 82 |
| 2 | 0 | 4 | 40 | 2 | 84 |
| 3 | 0 | 6 | 40 | 3 | 86 |
| 4 | 0 | 8 | 40 | 4 | 88 |
| 5 | 0 | 10 | 40 | 5 | 90 |
| 6 | 0 | 12 | 40 | 6 | 92 |
| 7 | 0 | 14 | 40 | 7 | 94 |
| 8 | 0 | 16 | 40 | 8 | 96 |
| 9 | 0 | 18 | 40 | 9 | 98 |
| 10 | 0 | 20 | 40 | 10 | 100 |
| 11 | 0 | 22 | 40 | 11 | 102 |
| 12 | 0 | 24 | 40 | 12 | 104 |
| 13 | 0 | 26 | 40 | 13 | 106 |
| 14 | 0 | 28 | 40 | 14 | 108 |
| 15 | 0 | 30 | 40 | 15 | 110 |
| 16 | 0 | 32 | 40 | 16 | 112 |
| 17 | 0 | 34 | 40 | 17 | 114 |
| 18 | 0 | 36 | 40 | 18 | 116 |
| 19 | 0 | 38 | 40 | 19 | 118 |
| 20 | 0 | 40 | 40 | 20 | 120 |
| 21 | 0 | 42 | 40 | 21 | 122 |
| 22 | 0 | 44 | 40 | 22 | 124 |
| 23 | 0 | 46 | 40 | 23 | 126 |
| 24 | 0 | 48 | 40 | 24 | 128 |
| 25 | 0 | 50 | 40 | 25 | 130 |
| 26 | 0 | 52 | 40 | 26 | 132 |
| 27 | 0 | 54 | 40 | 27 | 134 |
| 28 | 0 | 56 | 40 | 28 | 136 |
| 29 | 0 | 58 | 40 | 29 | 138 |
| 30 | 0 | 60 | 40 | 30 | 140 |
| 31 | 0 | 62 | 40 | 31 | 142 |
| 32 | 0 | 64 | 40 | 32 | 144 |
| 33 | 0 | 66 | 40 | 33 | 146 |
| 34 | 0 | 68 | 40 | 34 | 148 |
| 35 | 0 | 70 | 40 | 35 | 150 |
| 36 | 0 | 72 | 40 | 36 | 152 |
| 37 | 0 | 74 | 40 | 37 | 154 |
| 38 | 0 | 76 | 40 | 38 | 156 |
| 39 | 0 | 78 | 40 | 39 | 158 |
|    |   |    | 40 | 40 | 160 |

FIG. 14

| $ID_{10}+ID_{20}$ | $ID'_{10}$ | $ID'_{20}$ |
|---|---|---|
| 0 | 0 | 0 |
| 1 | 6 | 0 |
| 2 | 10 | 0 |
| 3 | 14 | 0 |
| 4 | 19 | 0 |
| 5 | 24 | 0 |
| 6 | 30 | 0 |
| 7 | 40 | 0 |
| 8 | 40 | 16 |

FIG. 16

| ADDRESS | DATA | |
|---|---|---|
| $ID_1+G_1$ | $ID_2$ | $G_2$ |
| 0 | 0 | 0 |
| 1 | 0 | 1 |
| 2 | 0 | 2 |
| 3 | 0 | 3 |
| 4 | 0 | 4 |
| 5 | 0 | 5 |
| 6 | 0 | 6 |
| 7 | 0 | 7 |
| 8 | 0 | 8 |
| 9 | 0 | 9 |
| 10 | 0 | 10 |
| 11 | 0 | 11 |
| 12 | 0 | 12 |
| 13 | 0 | 13 |
| 14 | 0 | 14 |
| 15 | 0 | 15 |
| 16 | 1 | 0 |
| 17 | 1 | 1 |
| 18 | 1 | 2 |
| 19 | 1 | 3 |
| 20 | 1 | 4 |
| 21 | 1 | 5 |
| 22 | 1 | 6 |
| 23 | 1 | 7 |
| 24 | 1 | 8 |

| ADDRESS | DATA | |
|---|---|---|
| $ID_1+G_1$ | $ID_2$ | $G_2$ |
| 49 | 3 | 1 |
| 50 | 3 | 2 |
| 51 | 3 | 3 |
| 52 | 3 | 4 |
| 53 | 3 | 5 |
| 54 | 3 | 6 |
| 55 | 3 | 7 |
| 56 | 3 | 8 |
| 57 | 3 | 9 |
| 58 | 3 | 10 |
| 59 | 3 | 11 |
| 60 | 3 | 12 |
| 61 | 3 | 13 |
| 62 | 3 | 14 |
| 63 | 3 | 15 |
| 64 | 4 | 0 |
| 65 | 4 | 1 |
| 66 | 4 | 2 |
| 67 | 4 | 3 |
| 68 | 4 | 4 |
| 69 | 4 | 5 |
| 70 | 4 | 6 |
| 71 | 4 | 7 |
| 72 | 4 | 8 |
| 73 | 4 | 9 |

| ADDRESS | DATA | |
|---|---|---|
| $ID_1+G_1$ | $ID_2$ | $G_2$ |
| 98 | 6 | 2 |
| 99 | 6 | 3 |
| 100 | 6 | 4 |
| 101 | 6 | 5 |
| 102 | 6 | 6 |
| 103 | 6 | 7 |
| 104 | 6 | 8 |
| 105 | 6 | 9 |
| 106 | 6 | 10 |
| 107 | 6 | 11 |
| 108 | 6 | 12 |
| 109 | 6 | 13 |
| 110 | 6 | 14 |
| 111 | 6 | 15 |
| 112 | 7 | 0 |
| 113 | 7 | 1 |
| 114 | 7 | 2 |
| 115 | 7 | 3 |
| 116 | 7 | 4 |
| 117 | 7 | 5 |
| 118 | 7 | 6 |
| 119 | 7 | 7 |
| 120 | 7 | 8 |
| 121 | 7 | 9 |
| 122 | 7 | 10 |

FIG. 16 (CONT.)

| | | |
|---|---|---|
| 11 | 7 | 123 |
| 12 | 7 | 124 |
| 13 | 7 | 125 |
| 14 | 7 | 126 |
| 15 | 7 | 127 |
| 0 | 8 | 128 |
| 1 | 8 | 129 |
| 2 | 8 | 130 |
| 3 | 8 | 131 |
| 4 | 8 | 132 |
| 5 | 8 | 133 |
| 6 | 8 | 134 |
| 7 | 8 | 135 |
| 8 | 8 | 136 |
| 9 | 8 | 137 |
| 10 | 8 | 138 |
| 11 | 8 | 139 |
| 12 | 8 | 140 |
| 13 | 8 | 141 |
| 14 | 8 | 142 |
| 15 | 8 | 143 |

| | | |
|---|---|---|
| 10 | 4 | 74 |
| 11 | 4 | 75 |
| 12 | 4 | 76 |
| 13 | 4 | 77 |
| 14 | 4 | 78 |
| 15 | 4 | 79 |
| 0 | 5 | 80 |
| 1 | 5 | 81 |
| 2 | 5 | 82 |
| 3 | 5 | 83 |
| 4 | 5 | 84 |
| 5 | 5 | 85 |
| 6 | 5 | 86 |
| 7 | 5 | 87 |
| 8 | 5 | 88 |
| 9 | 5 | 89 |
| 10 | 5 | 90 |
| 11 | 5 | 91 |
| 12 | 5 | 92 |
| 13 | 5 | 93 |
| 14 | 5 | 94 |
| 15 | 5 | 95 |
| 0 | 6 | 96 |
| 1 | 6 | 97 |

| | | |
|---|---|---|
| 9 | 1 | 25 |
| 10 | 1 | 26 |
| 11 | 1 | 27 |
| 12 | 1 | 28 |
| 13 | 1 | 29 |
| 14 | 1 | 30 |
| 15 | 1 | 31 |
| 0 | 1 | 32 |
| 1 | 2 | 33 |
| 2 | 2 | 34 |
| 3 | 2 | 35 |
| 4 | 2 | 36 |
| 5 | 2 | 37 |
| 6 | 2 | 38 |
| 7 | 2 | 39 |
| 8 | 2 | 40 |
| 9 | 2 | 41 |
| 10 | 2 | 42 |
| 11 | 2 | 43 |
| 12 | 2 | 44 |
| 13 | 2 | 45 |
| 14 | 2 | 46 |
| 15 | 2 | 47 |
| 0 | 3 | 48 |

FIG. 17

| 0 | 1 | 1 | 0 |
|---|---|---|---|
| 1 | 2 | 4 | 2 |
| 1 | 4 | # |   |

FIG. 18

|   | A | B |   |
|---|---|---|---|
| C | D | E | F |
| G | H | # |   |

| $ID_{10} + ID_{20}$ | $ID'_{10}$ | $ID'_{20}$ |
|---|---|---|
| 0 | 0 | 0 |
| 1 | 1 | 0 |
| 2 | 2 | 0 |
| 3 | 3 | 0 |
| 4 | 4 | 0 |
| 5 | 5 | 0 |
| 6 | 6 | 0 |
| 7 | 7 | 0 |
| 8 | 8 | 0 |
| 9 | 9 | 0 |
| 10 | 10 | 0 |
| 11 | 11 | 0 |
| 12 | 12 | 0 |
| 13 | 12 | 2 |
| 14 | 12 | 5 |
| 15 | 12 | 8 |
| 16 | 12 | 12 |

IMAGE PROCESSING APPARATUS ESPECIALLY SUITABLE FOR PRODUCING SMOOTH-EDGED OUTPUT MULTI-LEVEL TONE DATA HAVING FEWER LEVELS THAN INPUT MULTI-LEVEL TONE DATA

This application is a continuation-in-part of U.S. patent application Ser. No. 07/687,572, filed Apr. 19, 1991.

BACKGROUND OF THE INVENTION

The present invention relates generally to an image processing apparatus, and more particularly to an image processing apparatus in which a halftone image data is generated by making use of a prescribed image processing technique.

Conventionally, the dither process is used for carrying out bilevel rendition of a multilevel tone data of an image, through halftoning, to a bilevel data which can be appropriately output to a printer. In a case of the dither process, pixels of an input image data are compared with a predetermined dither matrix pattern to produce a bilevel data of pixels of an output image, but there is a problem in that picture resolution being achieved by the dither process is not compatible with the quality of an output image with good visual tone data. There is another halftoning method, which is an improved halftoning technique that is aimed at realizing suitable picture resolution and compatible visual tone quality of the output image. Such a halftoning technique is called herein an error diffusion method. In a case of this error diffusion method, an error of an optical density or intensity of a pixel of an image being produced in a bilevel rendition process is stored in a memory for subsequent use in the bilevel rendition process of other pixels adjacent to the subject pixel being considered, so that the intensity of pixels of the image is maintained after the bilevel rendition process is carried out. In order for determining a gray level via the error diffusion method, the influences of neighboring pixels on the subject pixel and the results of data conversion are incorporated. In the error diffusion method, errors of dot density between dots of an original image and dots of a reproduced image are locally diffused so that an image having the least approximation to the original image is generated. The above mentioned error diffusion technique of this kind is disclosed, for example, in "Digital Halftoning" (the name of a transaction contained in a journal published by the Institute of Television Engineers of Japan).

However, if the above mentioned error diffusion process is applied to a printer for printing an output image in which only a bilevel data is assigned to each pixel of the output image, there is a problem in that undesired pseudo stripe or moire pattern appear at portions of the output image where the dot density of the image does not clearly change. Especially when a screened halftone image data is processed through the error diffusion process and output to the above mentioned printer, it is difficult for the printer to suitably output continuous tone image which is in accordance with the original screened halftone image. In addition, in a case of a multilevel tone printer which is capable of varying a gray level of pixels of an output image by controlling the exposure time of laser light, it is difficult to suitably control the gray level of the output image for each pixel. Therefore, there is a problem in that the intensity of the actual output image cannot be made suitably in accordance with the value of control data used for outputting the output image having multilevel tone data to the multilevel tone printer.

SUMMARY OF THE INVENTION

Accordingly, it is a general object of the present invention to provide an improved image processing apparatus in which the above described problems are eliminated.

Another and more specific object of the present invention is to provide an image processing apparatus which generates an output image (whose pixels have "N" gray levels assigned thereto) from image data having multilevel tone data ("M" gray levels; $M > N \geq 2$) generated through a prescribed error diffusion process, the output image having image quality appropriate for being output to a printer such as a multilevel tone printer (which prints out an image whose pixels have "N" gray levels) so that a visually continuous tone image having good resolution can be reproduced. Still another object of the present invention is to provide an image processing apparatus which facilitates the controlling of the dot density of an output image without rendering undesired pseudo stripe or moire pattern to appear in the output image. The above mentioned objects of the present invention is achieved by an image processing apparatus which includes a scanner for inputting image data indicative of an image with a multilevel tone, a multilevel data part for generating multilevel tone data from the input image data, input by the scanner, through a prescribed error diffusion process, the multilevel data part outputting image data having pixels to which the multilevel tone data is assigned, a storage part for temporarily storing a value of one of two successive pixels included in the image data output by the multilevel data part, and a two-pixel processing part for converting the value of the one pixel stored in the storage part into a first value, and for generating second values of the two successive pixels using the first value of the one pixel, so that output image data is output to a printer, each pixel of the output image data being described by the second values of the two successive pixels generated by the two-pixel processing part. According to the present invention, it is possible to output an appropriate halftone image from the input image data having the multilevel tone input data generated through the error diffusion process, by making use of the two-pixel process. Also, it is possible to suitably control the exposure time of the printer by making use of two successive pixels in the halftone image data. Consequently, the gray level of an input image is more stably reproduced when compared with a case in which the exposure time is controlled by making use of every single pixel in the halftone image data. Appropriately continuous tone data is supplied to the printer so that a suitable output image is output to the printer, and therefore an undesired moire pattern is not likely to appear in the output image, ensuring good visual tone quality of the output image even when a screened halftone image is supplied. According to the present invention, the multilevel tone data supplied from the multilevel tone part is suitably in proportion to the gray level of pixels of an output image.

Other objects and further features of the present invention will be more apparent from the following detailed description when read in conjunction with the accompanying drawings.

BRIEF DESCRIPTION OF THE DRAWINGS

FIG. 7 is a diagram showing a relationship between the address value and the pixel value stored in a memory;

FIG. 8 is a block diagram showing a two-pixel part of the apparatus of FIG. 3;

FIG. 9 is a diagram showing a data conversion table stored in a data conversion memory;

FIG. 10 is a diagram showing a table which indicates relationship between the converted image data and the exposure time, which relationship is used to determine the exposure time;

FIG. 11 is a diagram showing a data conversion table indicating relationship between the data ID10+ID20, the data ID10', and the data ID20';

FIG. 12 is a diagram showing relationship between the dot density and the exposure time, which relationship is obtained from the chart of FIG. 5;

FIG. 13 is a diagram showing a table indicating another relationship between the data ID10', ID20' and the exposure time;

FIG. 14 is a diagram showing a data conversion table indicating another relationship between the data ID10+ID20, the data ID10', and the data ID20';

FIG. 16 is a diagram showing a data conversion table stored in a memory, which table is used in the multilevel rendition process as shown in FIG. 15;

FIG. 17 is a diagram showing an example of an error diffusion matrix used in the multilevel error diffusion process;

FIG. 18 is a diagram for explaining the correspondence between the diffusion matrix data shown in FIG. 17 and the error data A through H;

FIG. 21 is a diagram showing a conversion table having the relationship data stored in memory;

FIG. 22 is a diagram for explaining a relationship between the converted image data and the exposure time;

DESCRIPTION OF THE PREFERRED EMBODIMENTS

First, a description will be given of a first embodiment of an image processing apparatus according to the present invention, with reference to FIGS. 1 through 5.

Figure 1:
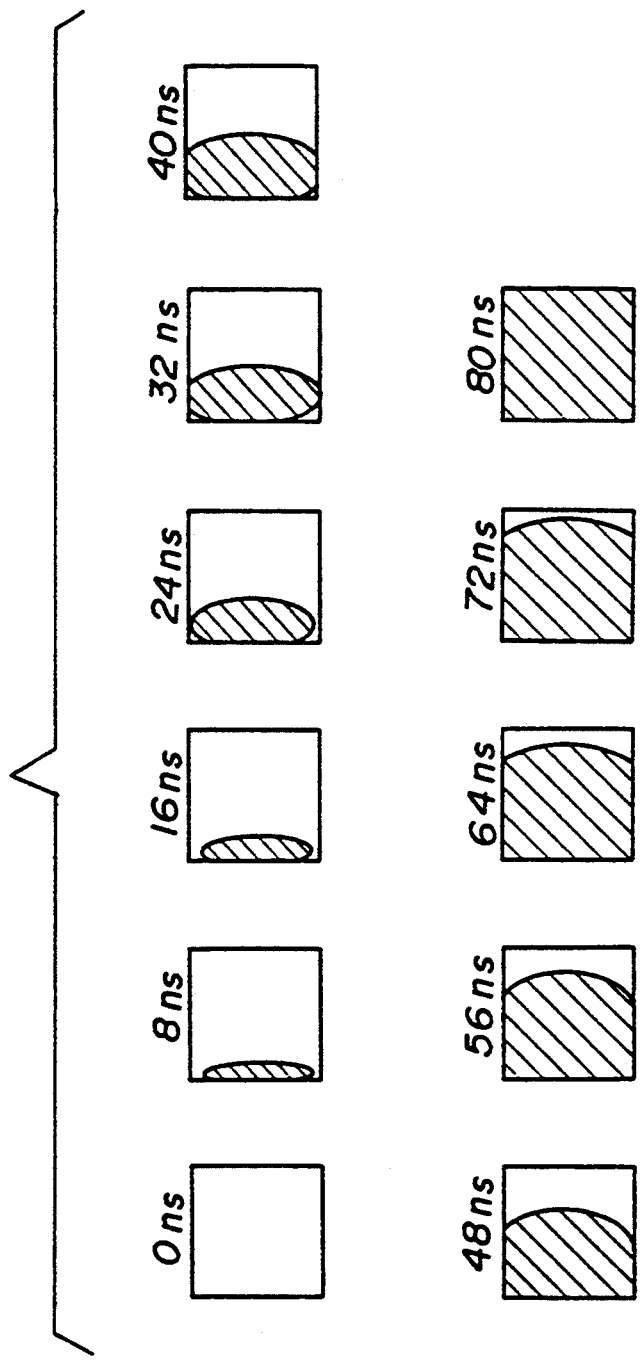
FIG. 1 is a diagram showing a set of gray levels which is assigned to each pixel of an output image in a conventional image processing method.

FIG. 1 shows several gray levels which are assigned in a conventional image processing to a pixel of an output image output to a printer. The ratio of a shaded area of a pixel relative to the total area of the pixel increases as the exposure time of a laser beam used in the printer for which a pixel of an image on a recording sheet is exposed by laser light used in a printer increases, and the dot density of an output image becomes higher when the exposure time increases. However, when the conventional image processing is applied, the actually reproduced image often shows undesired variations in the dot density relative to the actual exposure time, and exhibits significant differences in the dot density from those corresponding gray levels shown in FIG. 1.

Figure 2:
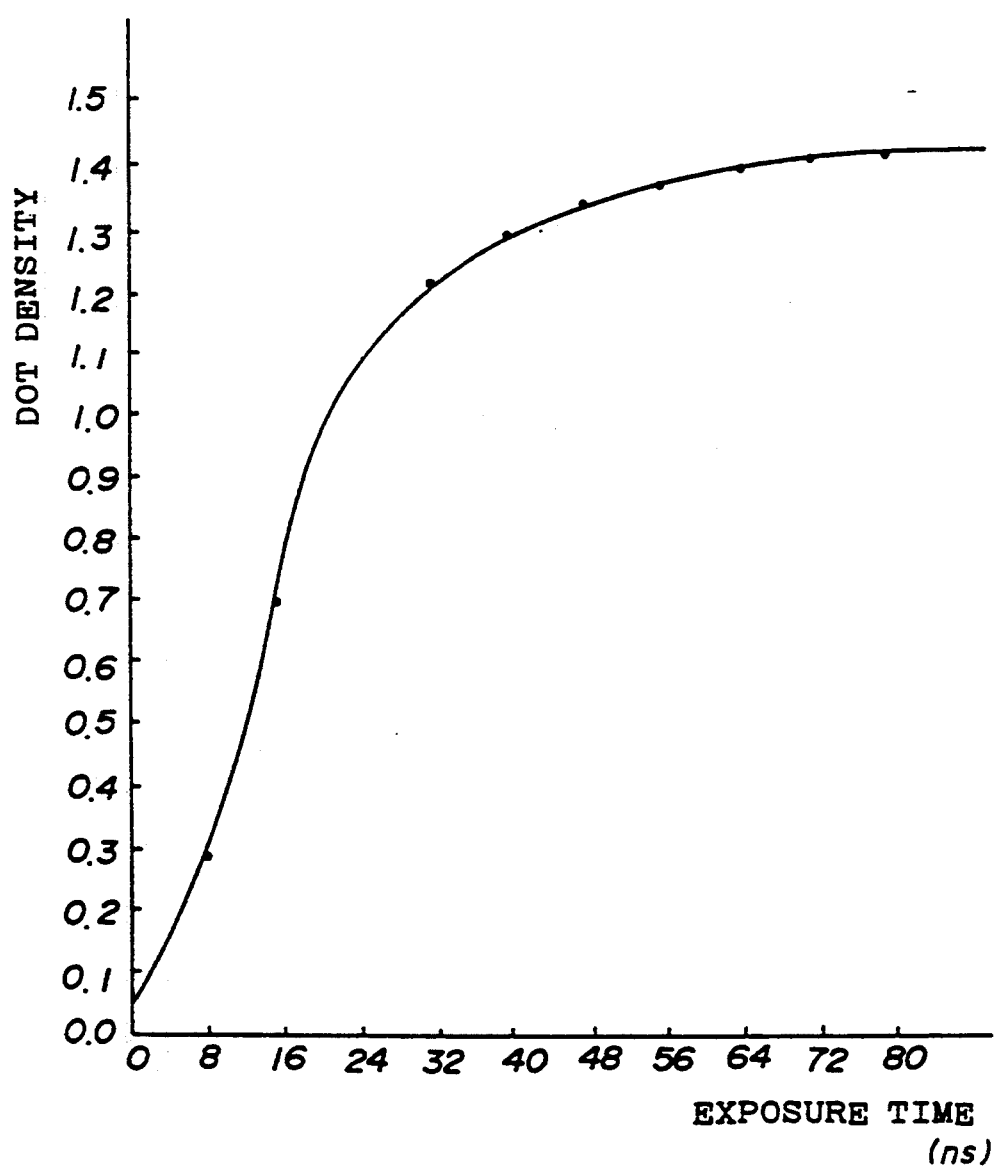
FIG. 2 is a characteristic chart showing a relationship between the dot density and the exposure time in the conventional image processing method.

FIG. 2 shows a characteristic chart of a conventional image processing apparatus that indicates a relationship between the exposure time and the dot density, which is measured from an output image actually output to an output device while the exposure time is varied so as to change the dot density of pixels. As being apparent from FIG. 2, apparent from FIG. 2, the change in the dot density and the change in the exposure time are not in proportion to each other. For example, the change in the dot density in a range thereof below 1.2 while the exposure time is varied is especially great, as shown in FIG. 2, and it is difficult to control the exposure time and the dot density in a range of the dot density which is lower than 1.2.

Figure 4:
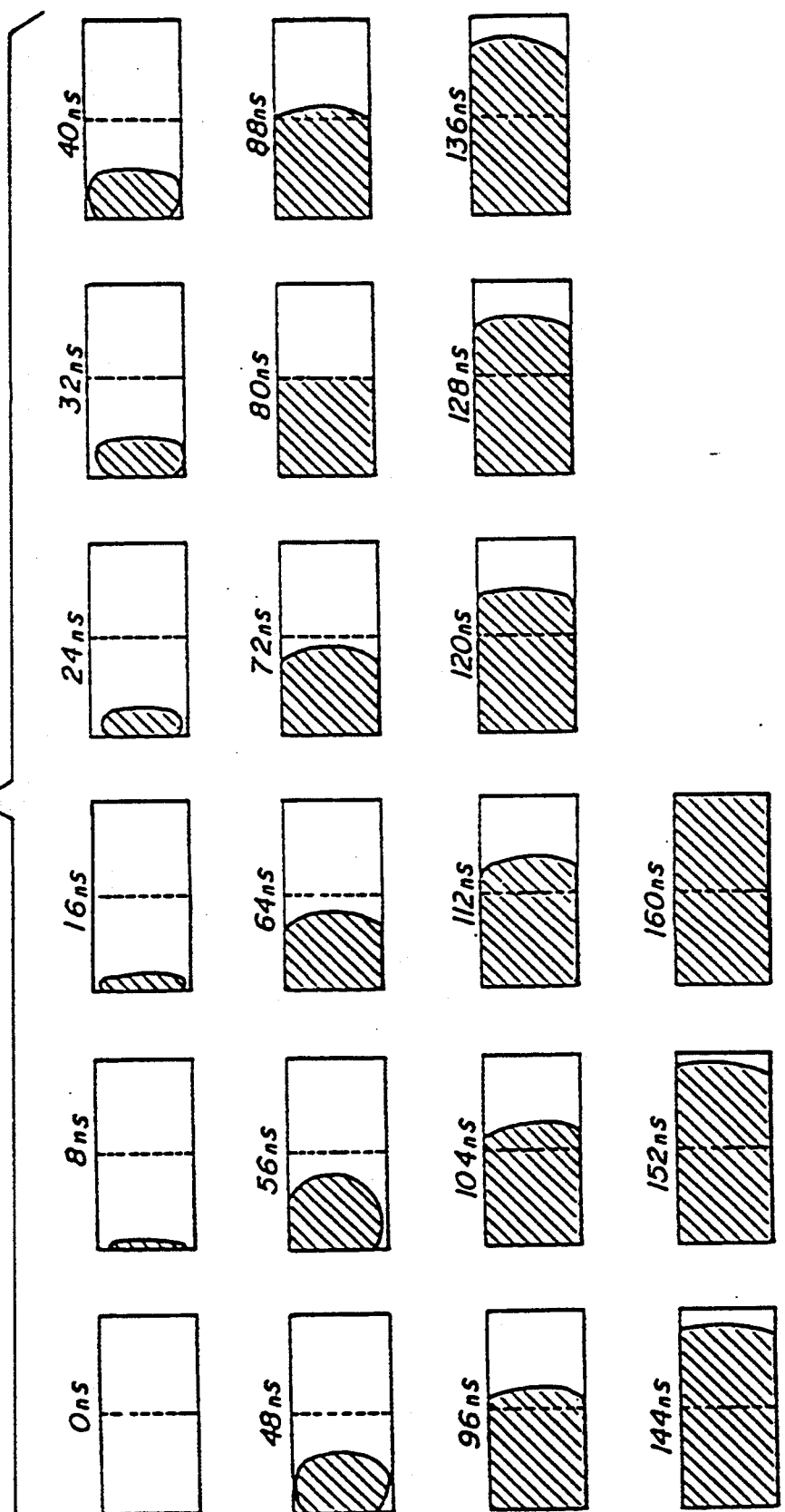
FIG. 4 is a diagram showing a set of gray levels which is assigned to each pixel of an output image in the image processing apparatus of the present invention.

FIG. 4 shows several gray levels which are assigned by the image processing apparatus of the present invention to a pixel of an output image to be output to the printer. The basic unit of image processing in the present invention is two successive pixels of an output image, and the respective sets of two successive pixels are processed so as to control the dot density of pixels of an output image being output to the printer 105. As shown in FIG. 4, a half of a frame being segmented by a dotted line indicates a single pixel, and the dot density of pixels are expressed by the respective sets of two pixels. In the first embodiment, it takes 80 nsec to expose one pixel of an image completely and it takes 160 nsec to subject two successive pixels of an image to exposure, which is twice as long as the case of one pixel exposure. Twenty one gray levels being assigned to a set of two pixels by varying the exposure time from 0 to 160 nsec are shown in FIG. 4.

Figure 5:
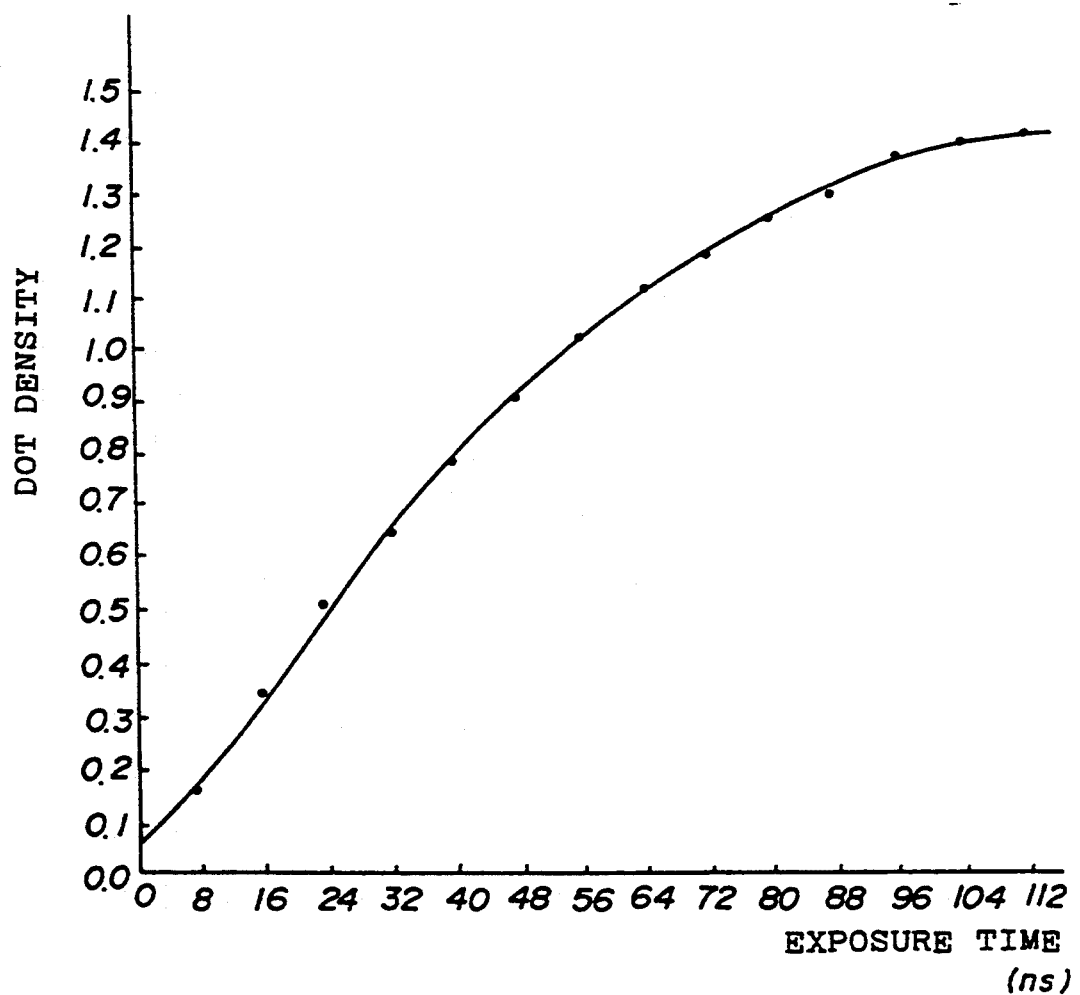
FIG. 5 is a characteristic chart showing a relationship between the dot density and the exposure time which is used by the image processing apparatus of the present invention.

FIG. 5 is a characteristic chart of the present invention that indicates a relationship between the exposure time and the dot density, which is measured from an output image being actually output to a printer, in which the exposure time is varied to change the dot density of pixels of the output image. As shown in FIG. 5, the change in the dot density and the change in the exposure time are substantially in proportion to each other since the exposure time is controlled by processing the respective sets of two successive pixels. The present invention can stably produce several gray levels of a pixel when compared with the above case in which the dot density is controlled by one pixel. As shown in FIG. 4, the change in the dot density in not so great in relation the change in the exposure time, and it is possible to easily control the exposure time and the dot density.

Figure 3:
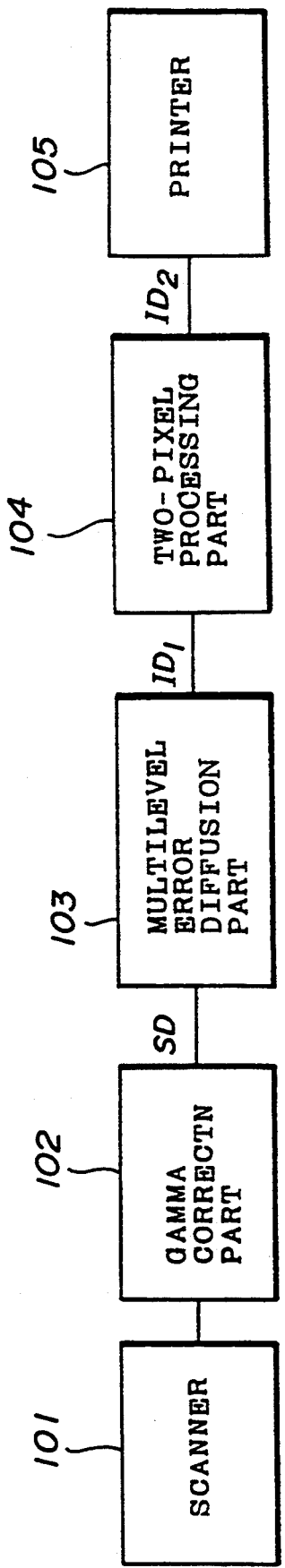
FIG 3 is a block diagram showing a first embodiment of an image processing apparatus according to the present invention.

FIG. 3 shows the construction of the embodiment of the image processing apparatus according to the present invention. In FIG. 3, the image processing apparatus includes a scanner 101, a gamma correction part 102, a multilevel error diffusion part 103, a two-pixel processing part 104 and a printer 105. The scanner 101 scans an original document so as to read out image information, and supplies image data, indicating the image information and having multilevel tone data, to the gamma correction part 102. The gamma correction part 102 performs a gamma correction of the image data supplied by the scanner 101, and outputs corrected image data to the multilevel error diffusion part 103. The multilevel error diffusion part 103 carries out an error diffusion process of the corrected image data supplied by the part 102, and outputs image data, which is generated after the error diffusion process is carried out, to the two-pixel processing part 104. The two-pixel processing part 104 carries out a two-pixel process of the image data supplied by the part 103. In this two-pixel process, a value of one of two successive pixels included in the input image data, generated after the error diffusion process, is converted into another value, and such a converted value is incorporated in each of values of two successive pixels after the two-pixel process is carried out. The two-pixel processing part 104 supplies image data (including a set of such converted two successive pixels generated after the two-pixel process is carried out) to the printer 105. The printer 105 receives the image data supplied by the part 104, and outputs an image in which a multilevel tone data is assigned to each pixel of the output image data.

Figure 6:
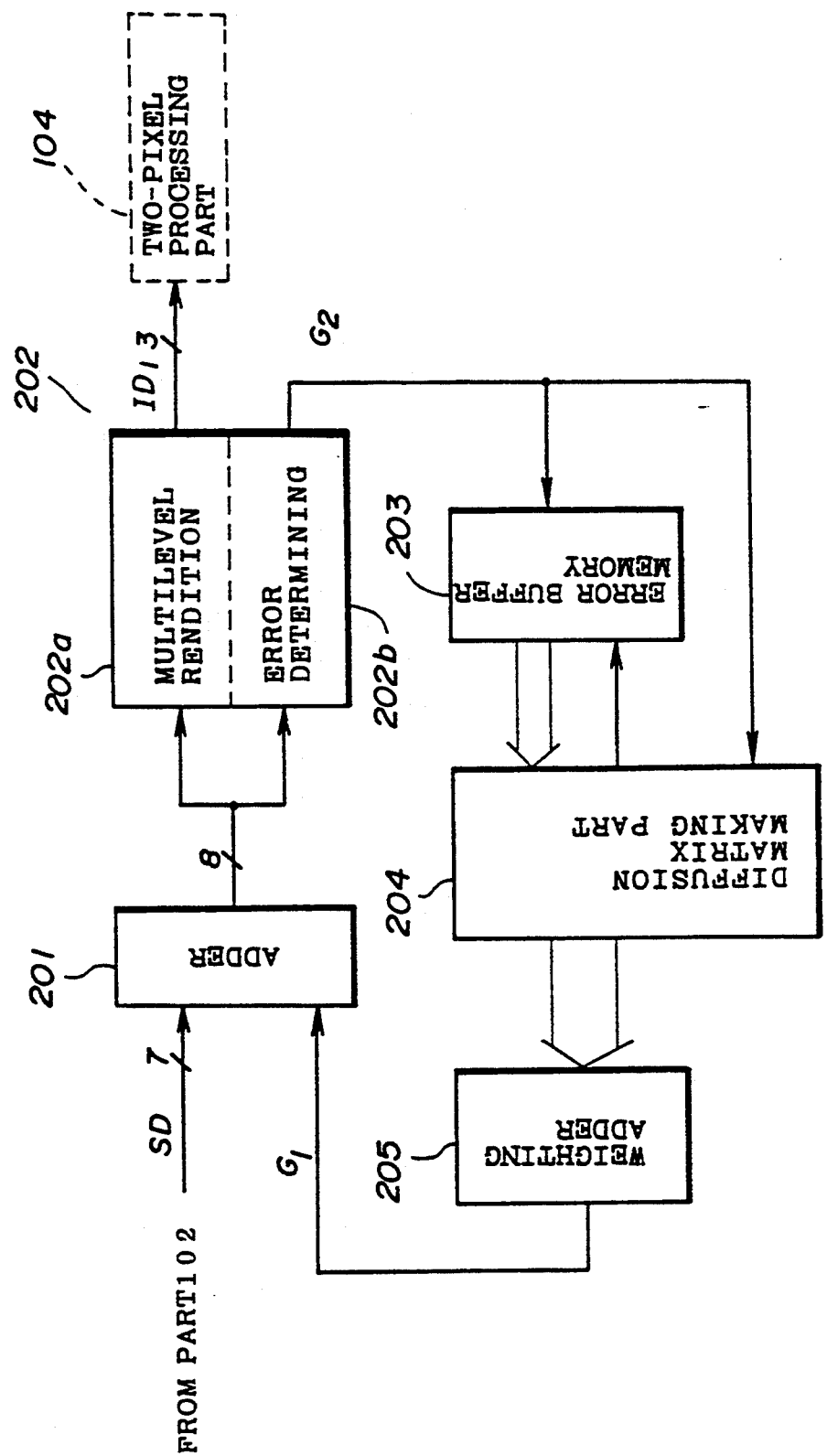
FIG. 6 is a block diagram showing a multilevel error diffusion part of the image processing apparatus of FIG. 3.

FIG. 6 shows the construction of the multilevel error diffusion part 103 of the image processing apparatus of FIG. 3. An adder 201 performs addition of an error data G1 to a 7-bit image data SD supplied by the gamma correction part 102 so as to correct image data, and outputs the corrected data SD+G1 to a read only memory ROM 202 which is coupled to the adder 201. The ROM 202 includes a multilevel rendition part 202a and an error determining part 202b, and it must have a storage capacity that can contain approximately 8 bit ×256. After a 8-bit address data which is the corrected data SD+G1 output by the adder 201 is received, a 3-bit image data ID1 is supplied by the multilevel rendition part 202a of the ROM 202 to the two-pixel processing part 104, and a 5-bit error data G2 is supplied by the error determining part 202b thereof to an error buffer memory 203 and to a diffusion matrix making part 204. The error data G2 supplied to the error buffer memory 203 (and to the diffusion matrix making part 204) is used in the subsequent image processing. A data conversion table, as shown in FIG. 7, is stored in the ROM 202 in accordance with the correspondence between the input address data value (SD+G1), the conversion data value (ID1) and the error data value (G2). As 5-level rendition of pixels of the image data is used in this embodiment, the value of 3-bit image data ID1 ranges from 0 to 4, and the value of 5-bit error data ranges from 0 to 31.

The error data G1 is computed by means of the error buffer memory 203, the diffusion matrix making part 204 and the weighting adder 205, and it is supplied to the adder 201, as shown in FIG. 6. The nearer the position of a weight data in a diffusion matrix is located in relation to the subject pixel in the image data, the greater the value of the weight data in the diffusion matrix is. If greater weights are given to the errors of neighboring pixels around the subject pixel, greater influence is rendered to the subject pixel.

FIG. 8 shows the construction of the two-pixel processing part 104 of the image processing apparatus of FIG. 3. As described above, in the two-pixel process, a value of one of two successive pixels in the input image data, supplied by the multilevel error diffusion part 103, is converted into another value in accordance with a data conversion table, and such a converted value is incorporated in each of values of two successive pixels in the output image data. The two-pixel processing part 104 includes two latch circuits 301 and 302, a counter 304, and a data conversion memory RAM 303. A 3-bit image data ID1 is supplied by the multilevel error diffusion part 103 to the latch circuits 301 and 302, and a terminal Q of the latch circuit 301 is coupled to a terminal D of the latch circuit 302. A clock signal CK1 having a given frequency is supplied to the latch circuit 301 and a clock signal CK2 having a frequency equal to half the frequency of the clock signal CK1 is supplied to the latch circuit 302. The latch circuit 301 is held in a latching condition per pixel for temporarily storing a value of a pixel each time a clock signal CK1 is output to the latch circuit 301. The latch circuit 302 is held in a latching condition per two pixels for temporarily storing a value of one of two successive pixels each time a clock signal CK2 is output to the latch circuit 302. A signal indicating the stored value of the pixel in the latch circuit 301 is supplied to the latch circuit 302. Thus, the latch circuit 302 outputs a set of two successive pixels to the data conversion memory 303, each data of the two successive pixels including a preceding 3-bit pixel data ID10 and a following 3-bit pixel data ID20.

After such image data is received from the latch circuit 302, the data conversion memory RAM 303 converts each of the image data including the two successive pixel data ID10 and ID20 into image data ID2 in accordance with a data conversion table stored in the RAM 303. The clock signal CK1 is also output to the counter 304, and the counter 304 operates so as to increment the number of pixels supplied to the latch circuit 301 each time the clock signal CK1 is output to the counter 304. The number of the pixels being supplied to the latch circuit 301 corresponds to the number of pixels being scanned by the scanner 101 in a main scanning direction. A signal X0 indicative of the least significant bit (LSB) of count data is supplied by the counter 304 to the data conversion memory 303. Using this signal X0, the data ID10+ID20 of each of two successive pixels in the image data is converted into a 4-bit image data ID2 by the data conversion memory 303. When a line synchro signal LSYNC is output to a terminal CLR of the counter 304, the count value of the counter 304 is reset to zero. The count data of the counter 304 is always reset to zero when a main scanning line of an output image printed by the printer 105 starts.

FIG. 9 shows the contents of the data conversion table stored in the data conversion memory 303. Each value of the ID10 and the ID20 is converted into a value of the ID2 in accordance with the data conversion table, which conversion is represented by the following formula:

$$ID10' = ID10 + INT\ (ID20/2)$$

$$ID20' = ID20 - INT\ (ID20/2) \qquad (1)$$

In this formula, ID10' and ID20' are values into which the preceding and following pixel values ID10 and ID20 are converted, and INT (ID20/2) indicates a rounded interger value of a 50% value of the pixel value ID20. The rounded interger value is obtained by rounding off the 50% value of the ID20 (the rounding to the nearest integer and the decimal fraction being discarded). The image data ID2 in the data conversion table of FIG. 9 denotes each value of the "ID10'" when the signal X0 indicating the LSB of the count data supplied by the counter 304 is at low level "L". When the signal X0 is at high level "H", the ID2 denotes each value of the "ID20'". FIG. 10 shows a table indicating a characteristic relationship between the converted image data ID2 (ID10', ID20') and the exposure time applied to the printer 105. It is possible to modify the conversion process performed with the RAM 303 in accordance with the exposure time characteristic of the printer used. In this embodiment, the preceding pixel data ID10' is first output, and the following pixel data ID20' is next output. FIG. 11 shows the contents of a table indicating relationship between the image data ID10+ID20, the ID10' and the ID20'.

According to the above described embodiment, it is possible to generate an output image (whose pixels have "N" gray levels assigned thereto) from image data having multilevel tone data ("M" gray levels; M>N≧2) which has been processed through an error diffusion process. The output image has image quality appropriate for being output to the multilevel tone printer ("N" gray levels) so that a visually continuous tone image having good resolution can be reproduced. The multilevel tone printer includes, for example, a laser beam printer, an ink jet printer, and a thermal printer. The number of multilevel tones, the size of the error diffusion matrix, and the kind of the error diffusion matrix are not limited to the above embodiment, and variations and modifications may be made according to the present invention.

Next, a description will be given of an adjusting process in which the exposure time of laser light used in the printer is adjusted in accordance with the value of each of two successive pixels after the multilevel error diffusion process is performed. The data of two successive pixels and the dot density of the output image are proportional to each other. FIG. 12 shows a relationship between the exposure time and the dot density, obtained from the characteristic chart shown in FIG. 5. The correspondence between the image data ID10', ID20' and the exposure time is predetermined as in the table shown in FIG. 13. The control of the exposure time is carried out on the basis of this relationship between the image data and the exposure time. By using the data conversion table as shown in FIG. 14, the dot density of the reproduced image data is represented as follows.

$$(Dot\ Density) = 0.17 \times ID \times 0.06$$

$$(ID) = (ID10 + ID20)$$

In this example, it is possible to control the exposure time of the printer such that the data of two successive pixels is proportional to the dot density of the output image.

Figure 15:
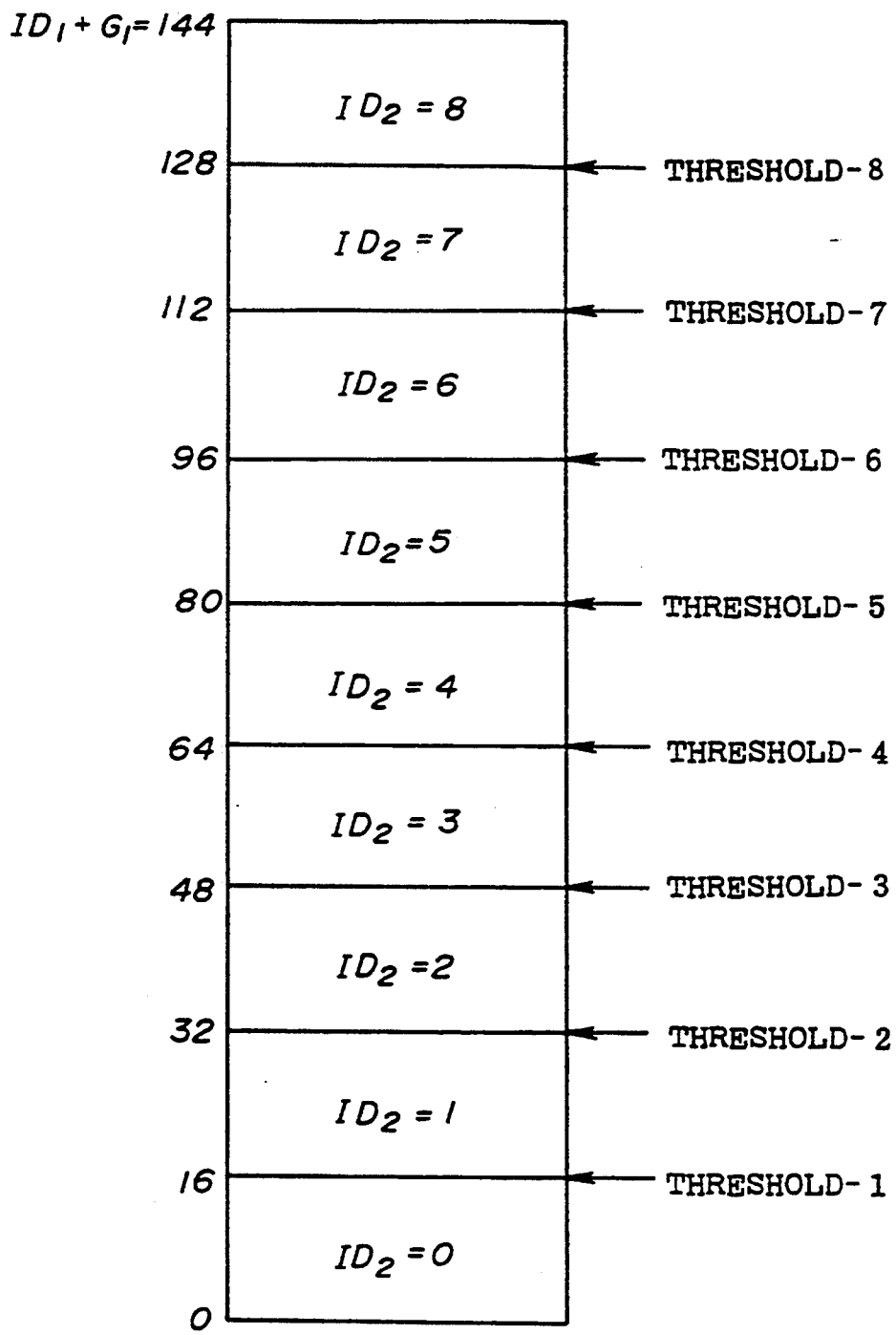
FIG. 15 is a diagram for explaining a modified multilevel rendition process which is applicable to the image processing apparatus of the present invention.

Referring to FIG. 15, a description will be given of a case in which a 9-level image data (0 to 8) is produced by the multilevel error diffusion part 103. A multilevel image data ID2 is supplied by the multilevel rendition part of the ROM 202 to the two-pixel processing part 104. The ROM 202 must have a storage capacity of approximately 8 bits ×256 of address data plus corresponding conversion data in this embodiment. Also, in this embodiment, a 9-level rendition of pixels of the image data is carried out, and the value of the 4-bit image data ID2 after the multilevel error diffusion process ranges from 0 to 8. This image data is supplied by the part 103 to the part 104.

A 7-bit image data ID is present after the gamma correction of the image data supplied by the scanner 101 is performed. A multilevel error diffusion process for the image data ID is carried out, and a 9-level image data ID' is supplied. Then, a multilevel data correction process for the image data ID' is carried out, so that a 10-level image data ID" in which the least significant bit of the image data from the scanner is added to the image data ID' is produced.

An error data G1 is added to the image data ID1 output by the gamma correction part, thus producing a corrected image data ID1+G1. A multilevel rendition process for this corrected image data ID1+G1 is carried out by the corrected image data ID1+G1 being compared with a plurality of predetermined threshold levels, thus producing a multilevel image data ID2. In the present example, a 9-level image data ID2 is produced in this multilevel rendition process, so eight different threshold levels with which the corrected image data ID1+G1 is compared are required for determining the value of image data ID2. For example, the value of the image data ID2 is determined as being equal to 1, when the corrected image data ID1+G1 is greater than a threshold-1 which is, in this example, equal to 16. The value of the ID2 is determined as being equal to 2, when the ID1+G1 is greater than a threshold-2, which is equal to 32. Similarly, the value of the ID2 is determined as being equal to 8, when the ID1+G1 is greater than a threshold-8 which is equal to 128. If the ID1+G1 is not greater than the threshold-1 (=16), then the image data ID2 is determined as equal to zero (=0). In this manner, the multilevel rendition process of the present invention is carried out.

The relationship between the IDI+G1, the threshold levels and the ID2 which relationship is used in this embodiment is shown in FIG. 16. In this embodiment, intervals between separate threshold levels are equally spaced from each other, but, in other cases, the threshold levels may be changed to another values so as to suit the output characteristics of the printer 105 for outputting an image having a multilevel tone data. For example, when a difference in optical density between 2nd and 3rd threshold values is greater than a difference in optical density between 3rd and 4th threshold values due to the output characteristic of the output device used, the difference between threshold-2 and threshold-3 values is adjusted so that it is greater than the difference between the threshold-3 and threshold-4 values.

Simultaneously with the performance of the multilevel rendition process described above, an error data G2 is determined corresponding to the image data ID2, as being equal to a difference between a corrected image data ID1+G1 and the maximum threshold value that is greater than the corrected image data ID1+G1. For example, when a corrected image data ID1+G1 is equal to 74, this data is greater than the value of threshold-4 (=64) but is smaller than the value of threshold-5 (=80). The error data G2 in this case is computed as being equal to a difference between 64 and 74, or 10. This error data G2 is stored in the error buffer memory 203, and the stored error data G2 is read out from the error buffer memory 203 for use in the processing of subsequent pixels.

Figures 17, 18:
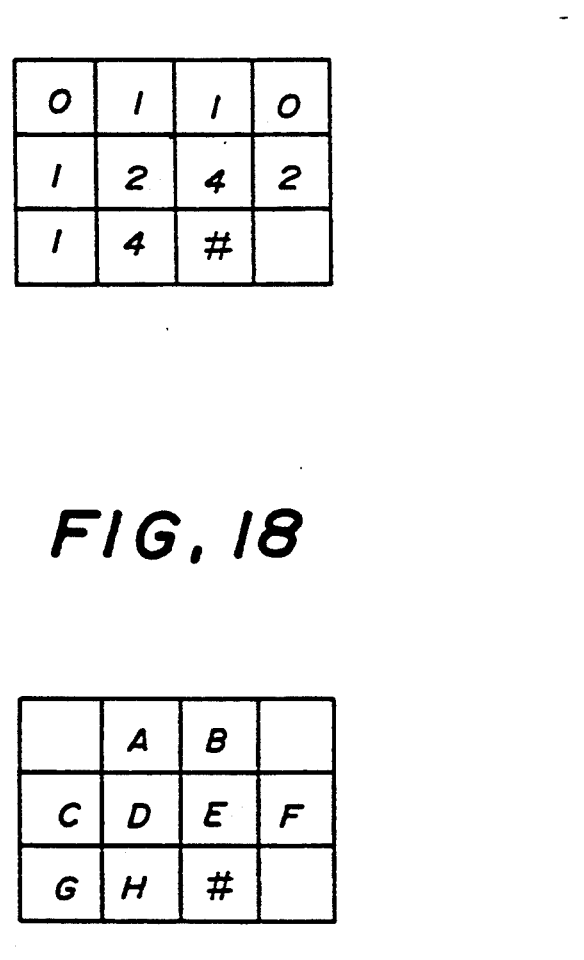

FIGS. 17 and 18 show an example of a diffusion matrix which is used in the multilevel error diffusion process. This diffusion matrix has a size which is composed of rows corresponding to four pixels in the main scanning direction and columns corresponding to three pixels in the sub scanning direction. In FIGS. 17 and 18, "#" denotes the subject pixel being considered in the multilevel error diffusion process. Concerning the coefficients of the diffusion matrix, the nearer to the pixel indicated by # the position of a coefficient of the matrix, the greater is the value of the coefficient. And, the coefficients of the diffusion matrix are equal to any of the values of two's power data. This will simplify the construction of the adder 201.

Figure 19:
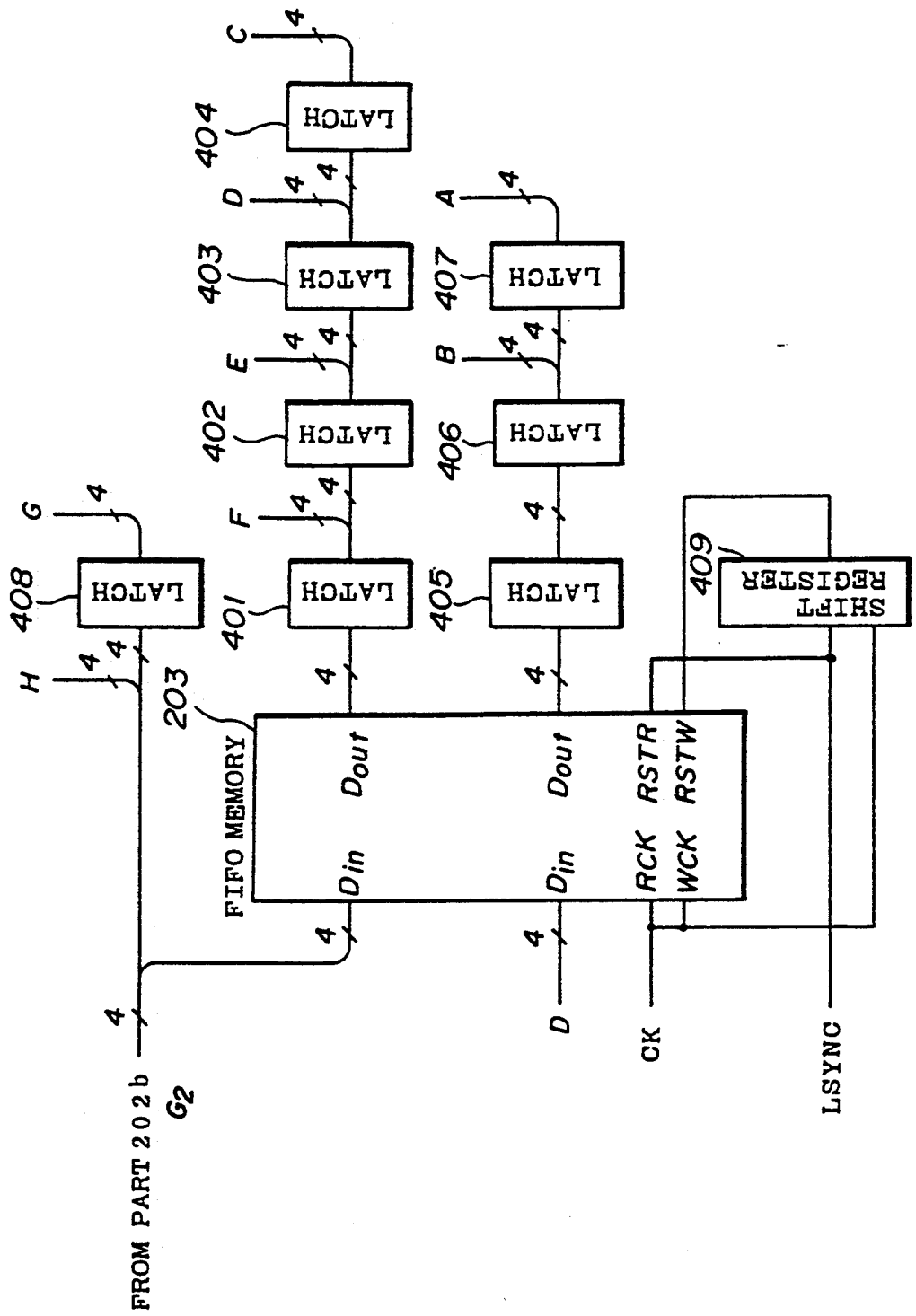
FIG. 19 is a block diagram showing the error buffer memory and the diffusion matrix making part shown in FIG. 6.

FIG. 19 shows the construction of the diffusion matrix making part 204 with the error buffer memory 203. As shown in FIG. 19, the error buffer memory 203 uses a first-in/first-out (FIFO) memory, and the error data G2 from pixels of two scanning lines is stored in this error buffer memory 203. This FIFO memory has an internal address counter, and performs a read operation, a write operation and an address counter reset operation by means of a read clock (RCK) and a write clock (WCK) which are supplied to the respective clock signal terminals of the FIFO memory. To reset the address counter, the FIFO memory includes a read reset counter (RSTR) terminal and a write reset counter (RSTW) terminal to which a read reset signal and a write reset signal are supplied respectively. A shift register 409 is coupled to these clock terminals and counter terminals of the memory 203.

Figure 20:
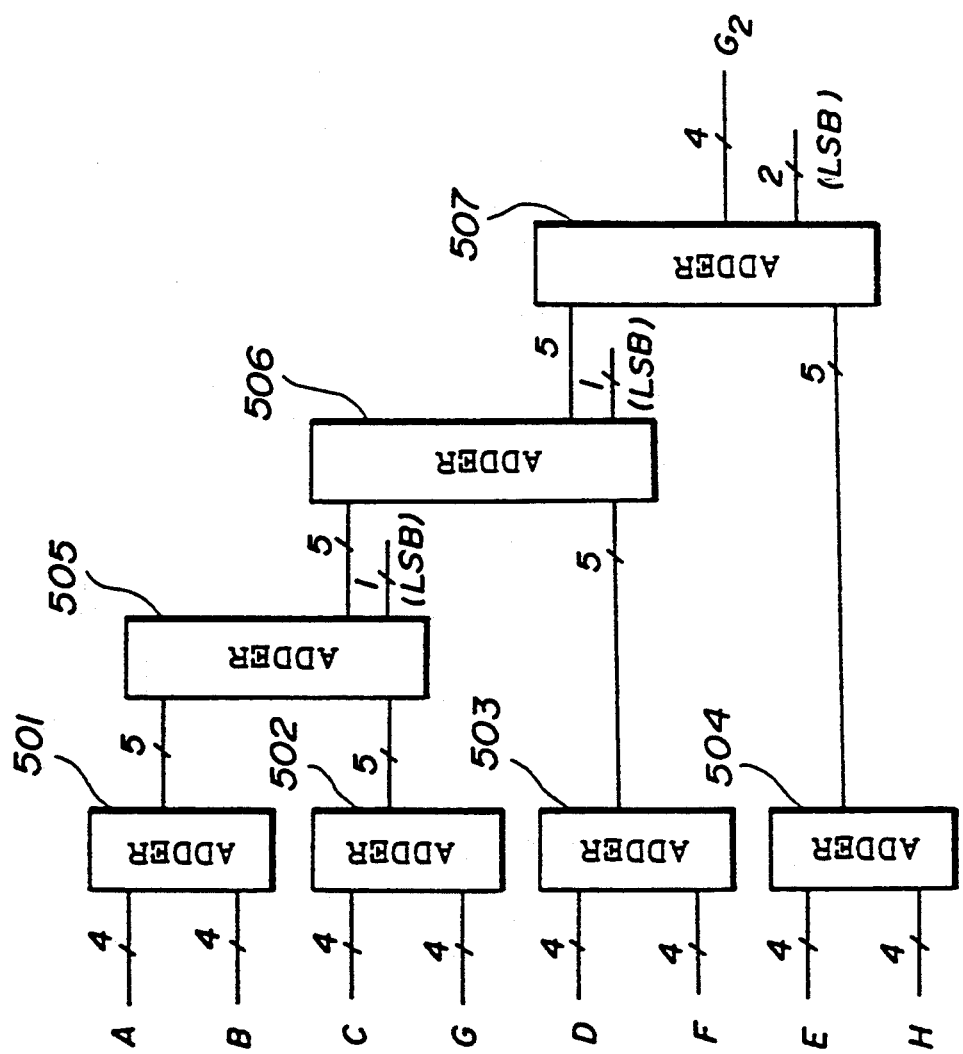
FIG. 20 is a block diagram showing a modified weighting adder shown in FIG. 6.

In the above described embodiment, by varying suitably the timings with which RSTR and RSTW signals are output to the FIFO memory 203, a diffusion matrix of error data is easily produced for carrying out a weighting operation of the error data. Latch circuits 401 through 404 are coupled in series to a terminal Dout of the FIFO memory 203, and latch circuits 405 through 407 are coupled in series to another terminal Dout of the FIFO memory 203. Also, a latch 'circuit 408 is coupled to the error determining part 202b. A number of 4-bit data temporarily stored in these latch circuits correspond with the error data A through H in the diffusion matrix shown in FIG. 18. The shift register 409 is provided to delay the timing with which the signal RSTW is supplied by three clock pulses after the timing with which the signal RSTR is supplied to the FIFO memory 203. FIG. 20 shows a construction of the weighting adder 205. Among a number of error data A through H, a pair of error data A and B, a pair of error data C and G, a pair of error data D and F and a pair of error data E and H are supplied to an adder 501, an adder 502, an adder 503 and an adder 504, respectively. Output data output by the adders 501 and 502 are supplied to an adder 505, and output data output by the adders 503 and 505 are supplied to an adder 506, and further output data output by the adders 504 and 506 are supplied to an adder 507. An output data output by the adder 507 is the error data G2 which is supplied to the adder 201.

A weighting addition is performed for a number of the error data A through H by the circuitry shown in FIG. 20, on the basis of the diffusion matrix shown in FIG. 17. Weighting coefficients in the diffusion matrix are equal to the values of two's power number, and a weighting is carried out by shifting a bit position of each error data held in the adders 501 through 504. A weight applied to the error data in the adder 501 is twice as great as a weight applied to the error data in the adder 502. Five most significant bits out of the output data from the adder 505 are supplied to the adder 506, by removing the least significant bit from the 6-bit output data from the adder 505. Similarly, five most significant bits out of the output data from the adder 506 are supplied to the adder 507, by removing the least significant bit from the 6-bit output data. And, four most significant bits out of the output data from the adder 507 are used as the weighted error data G2 which is supplied to the adder 201 shown in FIG. 6.

Figure 21:
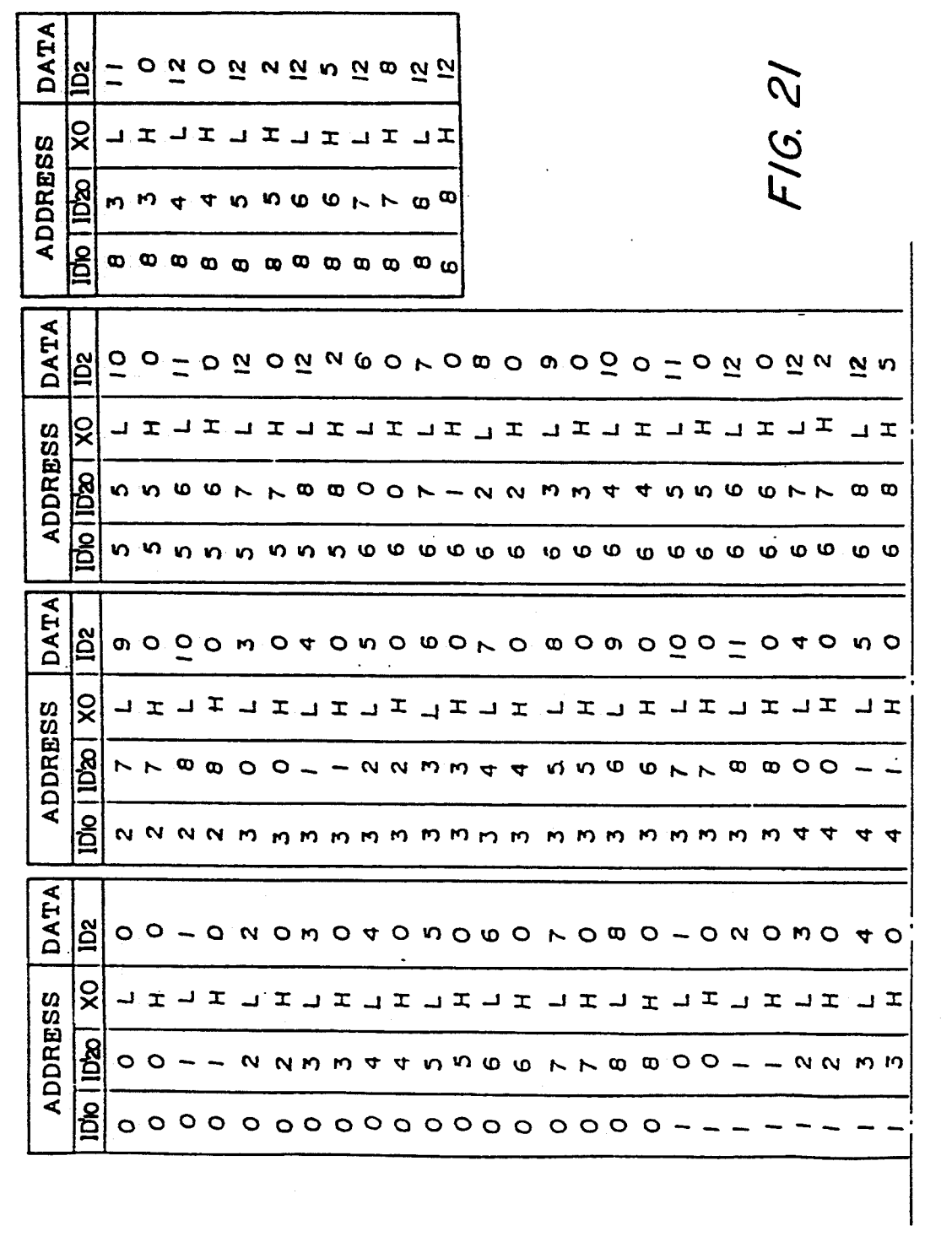
Figure 21:
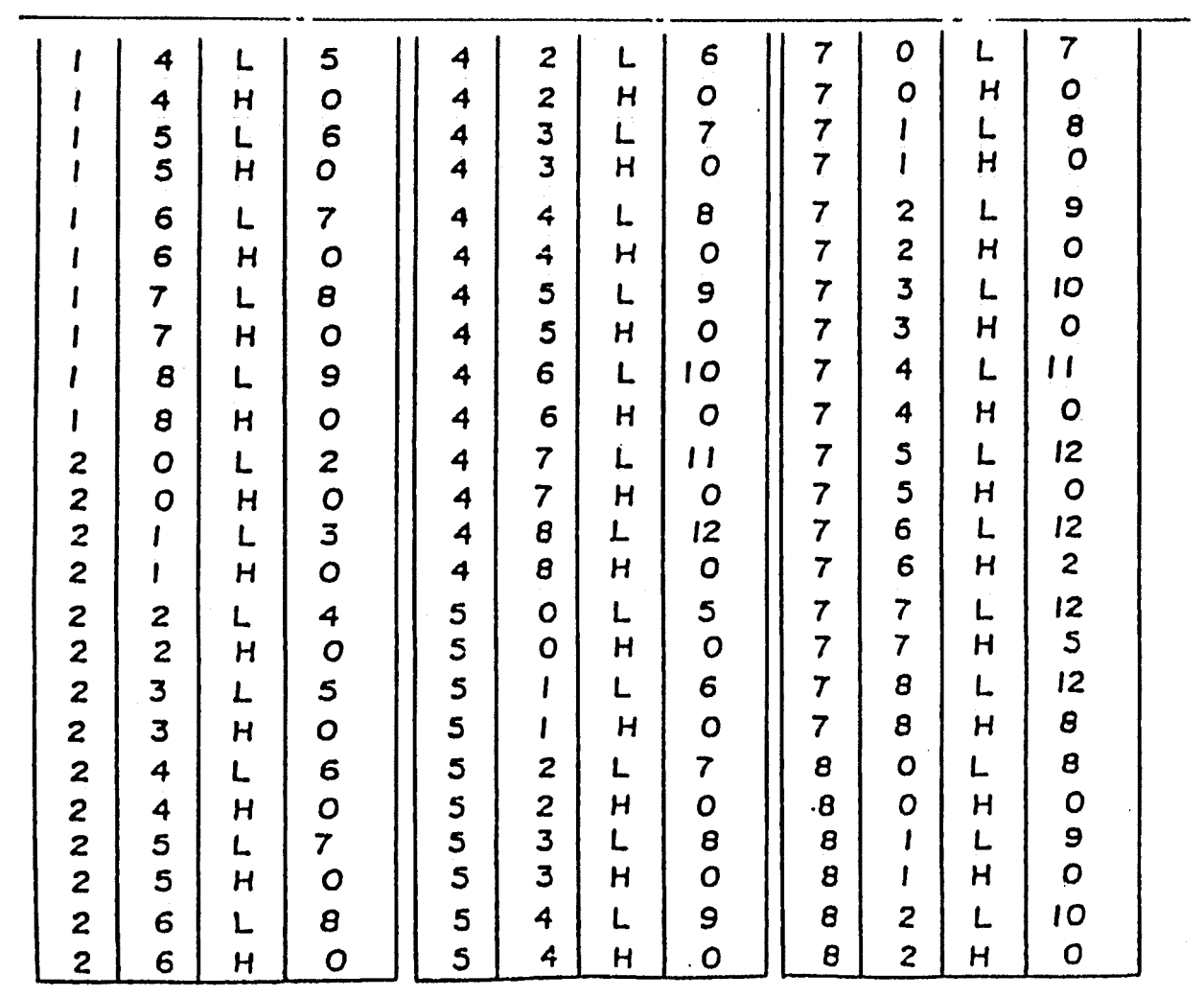

FIG. 21 shows a data conversion table which is stored in the data conversion memory 303 shown in FIG. 8, and FIG. 22 shows a data conversion table indicating relationship between the image data ID10+ID20, the data ID10' and the data ID20'. A data conversion from the image data ID10+ID20 into the image data ID2 which is carried out on the basis of the data conversion table shown in FIG. 22 is represented by the above formula (1). The image data ID2 denotes the value of the "ID10'" when the signal X0 indicating the LSB of a count data in the counter 304 is at low level "L", and the ID2 denotes the value of "ID20'" when the LSB signal X0 from the counter 304 is at high level "H". The conversion process performed with the RAM 303 can be modified in accordance with the exposure time characteristic of the printer. In the present embodiment, the preceding pixel ID10' is first output and the following pixel ID20' is next output. In the above embodiment, it is preferentially determined that a value of the image data ID2 converted from the preceding pixel data ID10' is greater than a value of the ID2 converted from the following pixel data ID20'. However, the converse order of the output is also possible; the image data ID2 of the following pixel ID20' being first output, and the image data ID2 of the preceding pixel ID10' being next output.

In the image processing apparatus of the present invention, image data with multilevel tone bits assigned thereto is generated from input image data through a prescribed error diffusion process, and the dot intensity of an output image is varied per two pixels. In the two-pixel process performed by the two-pixel processing part of the apparatus, a value of one of two successive pixels in the input image data, generated after the error diffusion process, is converted into another value, and such a converted value is incorporated in each of values of two successive pixels after the two-pixel process is carried out. Therefore, it is possible to generate an appropriate output image (whose pixels have "N" gray levels assigned thereto) from the input image data having multilevel tone data ("M" gray levels; $M > N \geq 2$) generated after the error diffusion process is performed, the output image having image quality appropriate for being output to a printer including a multilevel tone printer (which can print out an image whose pixels have "N" gray levels) so that a visually continuous tone image having good resolution can be reproduced without rendering undesired moire pattern to the output image. Also, it is possible to easily control the dot intensity because the dot intensity can be suitably adjusted by means of the control part per two pixels of the output image. When compared with the single-pixel case in which the exposure time is controlled per pixel, it is possible to generate an output image having more stable resolution with better image quality. In other words, undesired considerable change in the dot density does not occur in the output image if the exposure time of the printer is suitably adjusted per two pixels. Also, according to the present invention, the value converted from a preceding pixel of the two successive pixels is determined preferentially as being greater than the value converted from a following pixel thereof.

Figure 23:
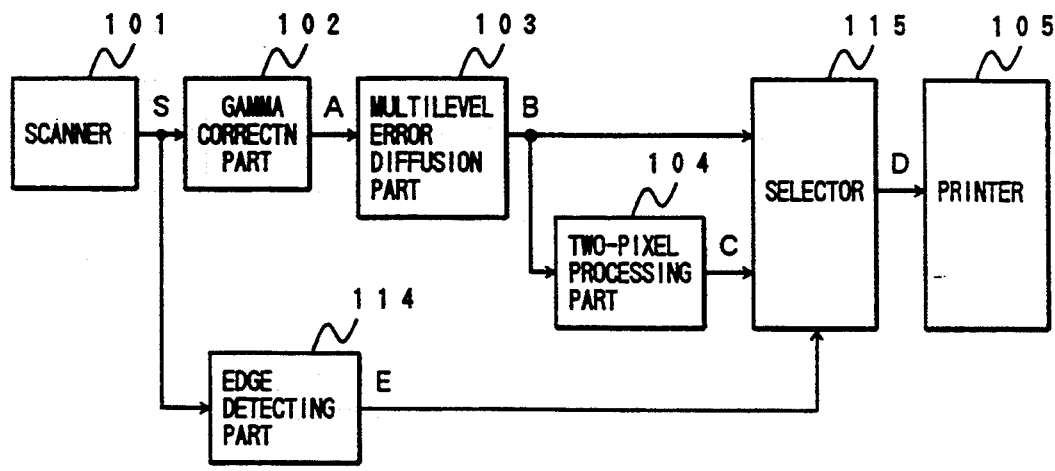
FIG. 23 is a block diagram showing a second embodiment of the image processing apparatus of the present invention.

Next, a description will be given of a second embodiment of the present invention, with reference to FIGS. 23 and 24. The component parts of the image processing apparatus shown in FIG. 23 which are the same as those corresponding parts of the apparatus of FIG. 3 are designated by the same reference numerals, a description thereof being omitted. In FIG. 23, the image processing apparatus includes an edge detecting part 114 for detecting whether or not a pixel of the input image data supplied by the scanner 101 shows an edge of the original image, and further includes a selector 115 coupled to an output of the multilevel error diffusion part 103 and to an output of the two-pixel processing part 104. The selector 115 outputs a signal D to the printer 105, this signal D indicating either the level of a signal B supplied by the part 103 or the level of a signal C supplied by the part 104 in accordance with the level of a signal E supplied by the edge detecting part 114, as described in the following.

Figure 24:
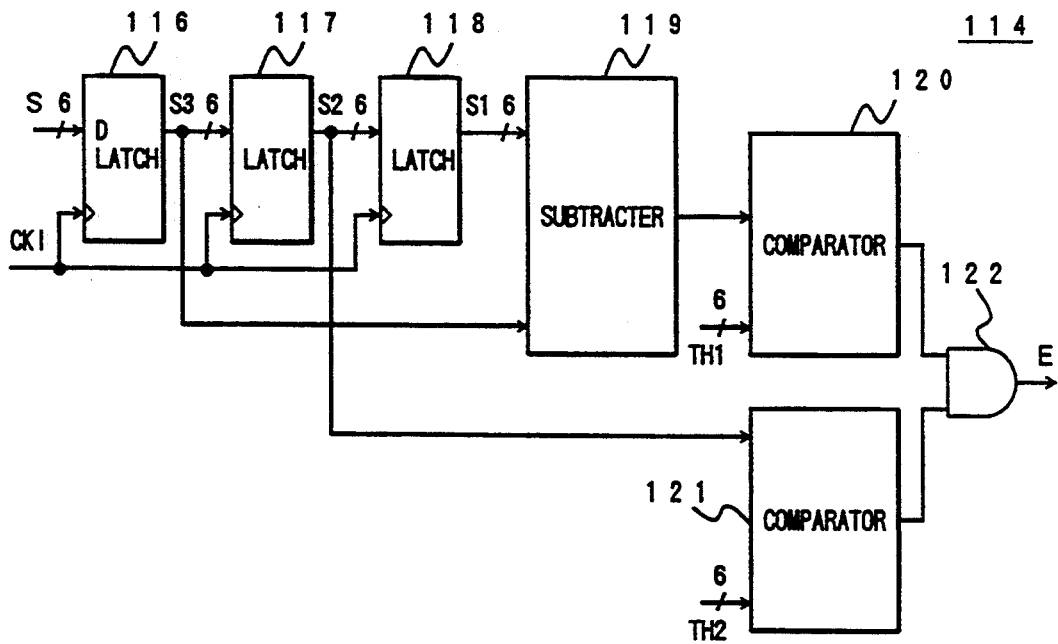
FIG. 24 is a diagram showing an edge detecting part of the image processing apparatus of FIG. 23.

FIG. 24 shows the construction of the edge detecting part 114 of FIG. 23. In FIG. 24, this edge detecting part 114 includes three latch circuits 116, 117 and 118, a subtracter 119, two comparators 120 and 121, and an AND gate 122. Three successive pixels of the input image S supplied by the scanner 101 are input to this part 114, and they are temporarily stored in the latch circuits 116 through 118 in synchronism with the clock signals CK1 being supplied to the circuits 116 through 118. The latch circuits 116 through 118 always output data of three successive pixels of the input image during image processing. For the sake of convenience, data of the pixels supplied by the latch circuits 118, 117 and 116 are respectively referred to as a first pixel value S1, a second pixel value S2, and a third pixel value S3. After the first pixel value S1 and the third pixel value S3 are received from the circuits 116 and 118, the subtracter 119 outputs a signal indicative of a value "S3−S1" of a difference between the first pixel value and the third pixel value, to the comparator 120. In the comparator 120, the difference value "S3−S1" is compared with a predetermined threshold TH1. If the difference value "S3−S1" is higher than the threshold TH1, the comparator 120 outputs a signal at high level to the AND gate 122. After the second pixel value S2 (which relates to a subject pixel in the edge detecting process) is received from the circuit 117, the comparator 121 performs another comparison process. In this process, the second pixel value S2 is compared with a predetermined threshold TH2. If the value S2 is lower than the threshold TH2, the comparator 121 outputs a signal at high level to the AND gate 122. Only when both the signals received from the comparators 120 and 121 have a high level, the AND gate 122 outputs the signal E to the selector 115, the signal E indicating that the pixel indicates an edge of the input image. In this case, a front-side edge with relation to the main scanning line is detected in the input image.

In FIG. 23, the selector 115 is also coupled to an output of the edge detecting part 114. When it is detected that a pixel of the input image data output by the scanner 101 is an edge of the input image, the edge detecting part 114 outputs a signal at high level "H" to the selector 115. This signal having high level "H" is herein called an edge detection signal. When the edge detection signal is received, the selector 115 outputs the image signal ID1, supplied by the part 103, to the printer 105. On the other hand, when it is detected by the edge detecting part 114 that a pixel of the input image data is not an edge of the input image, the edge detecting part 114 outputs a signal at low level "L" to the selector 115. When the low-level signal is received from the part 114, the selector 115 outputs the image signal ID2, supplied by the two-pixel processing part 104, to the printer 105. In other words, in accordance with the level of the signal supplied by the edge detecting part 114, the selector 115 selects either the signal B supplied by the part 103 or the signal C supplied by the part 104 so as to output the signal D indicating an appropriate output image to the printer 105. If the pixel of the input image does not represent an edge of the input image, the output image data after the above described two-pixel process is performed is supplied to the printer 105. If the pixel of the input image represents an edge of the input image, the output image data supplied by the multilevel error diffusion part 103 (no two-pixel process being performed) is output to the printer 105. It should be noted that an edge detecting part applicable to the invention is not limited to the device shown in FIG. 24, and that a known digital filter technique can also be used as the edge detection part applicable to the invention. According to the second embodiment described above, it is possible to prevent undesired pseudo stripe from appearing in the output image, the image processing apparatus thus producing the output image with good image quality.

Conventionally, there is an edge detecting device for detecting whether or not a pixel of an in-process image is an edge of an input image in accordance with a difference in gray level between two adjacent pixels of the input image. However, when the gray level difference is relatively small, there is a problem in that the accuracy of the edge detecting part of FIG. 24 when detecting the edge of the input image becomes worse.

Figure 25:
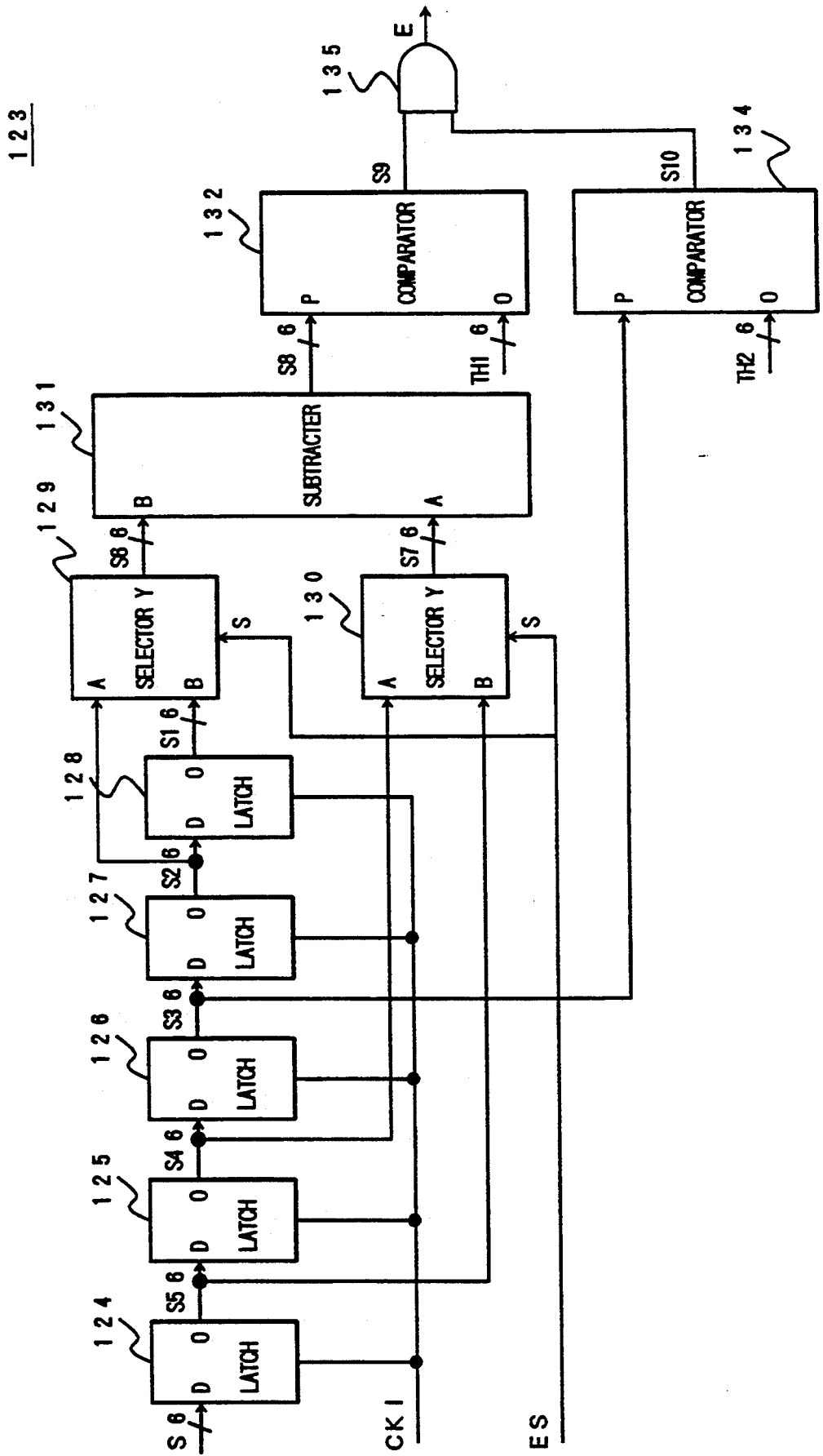
FIG. 25 is a diagram showing a modified edge detecting part of the image processing apparatus of FIG. 23.

FIG. 25 shows an improved edge detecting part in which the above described problem is eliminated and the edge is accurately detected even when the gray level difference of adjacent pixels of the input image is relatively small. This edge detecting part is different from the above part 114 but is also applicable to the present invention. In FIG. 25, this edge detecting part 123 includes five latch circuits 124 through 128, two selectors 129 and 130, a subtracter 131, two comparators 132 and 134, and an AND gate 135. In this edge detecting part 123, five successive pixels of the input image S supplied by the scanner 101 are input, and they are temporarily stored in the latch circuits 124 through 128 in synchronism with the clock signals CK1 being supplied to these five circuits. The latch circuits 124 through 128 always output data of five successive pixels of the input image during image processing. For the sake of convenience, data of the pixels supplied by the latch circuits 128, 127, 126, 125 and 124 are respectively referred to as a first pixel value S1, a second pixel value S2, a third pixel value S3, a fourth pixel value S4, and a fifth pixel value S5.

After the first pixel value S1 and the second pixel value S2 are respectively received from the circuits 128 and 129, the selector 129 outputs a signal S6 to the subtracter 131, this signal S6 indicating either the first pixel value S1 or the second pixel value S2. Similarly, after the fourth pixel value S4 and the fifth pixel value S5 are respectively received from the circuits 125 and 124, the selector 130 outputs a signal S7 to the subtracter 131, this signal S7 indicating either the fourth pixel value S4 or the fifth pixel value S5. Each of the selectors 129 and 130 performs pixel value selection in accordance with a state of a select signal ES supplied to each select terminal of the selectors. If the select signal ES having a state indicating the value zero "0" is received, each of the selectors 129 and 130 outputs the signal indicating the content of a pixel value signal received from its terminal "A". In this case, the signal S6 output by the selector 129 is the same as the signal indicating the second pixel value S2, and the signal S7 output by the selector 130 is the same as the signal indicating the fourth pixel value S4. If the select signal ES having a state indicating the value one "1" is received, each of the selectors 129 and 130 outputs the signal indicating the content of a pixel value signal received from its terminal "B". In this case, the signal S6 output by the selector 129 is the same as the signal indicating the first pixel value S1, and the signal S7 output by the selector 130 is the same as the signal indicating the fifth pixel value S5.

This select signal ES is generated by a prescribed circuit (not shown). For example, when the input image data S is indicated by an image signal generated after an MTF correction process is performed, the select signal ES is set to the state indicating the value "0". When the input image data S is indicated by an image signal after an anti-aliasing process is performed (or an image signal with no filter process being performed), the select signal ES is set to the state indicating the value "1".

After the signals S6 and 7 are received from the selectors 129 and 130, the subtracter 131 outputs a signal S8 to the comparator 132, this signal S8 indicating a value "S7−S6" of a difference between the two pixel values indicated by the signals S6 and S7. After the signal S8 is received, the comparator 132 performs a pixel value comparison process. After the third pixel value S3 (which relates to the subject pixel in the edge detecting process) is received from the circuit 126, the comparator 134 performs another pixel value comparison process. The functions of the comparators 132 and 134 and the functions of the AND gate 135 are the same as those of the comparators 120 and 121 and of the AND gate 122 of FIG. 24, a description thereof being omitted. According to this edge detecting part 123 of FIG. 25, it is possible to accurately detect the edge of the input image even when the gray level difference is relatively small because the pixel value difference has a level great enough to be correctly detected by the edge detecting part.

Figure 26:
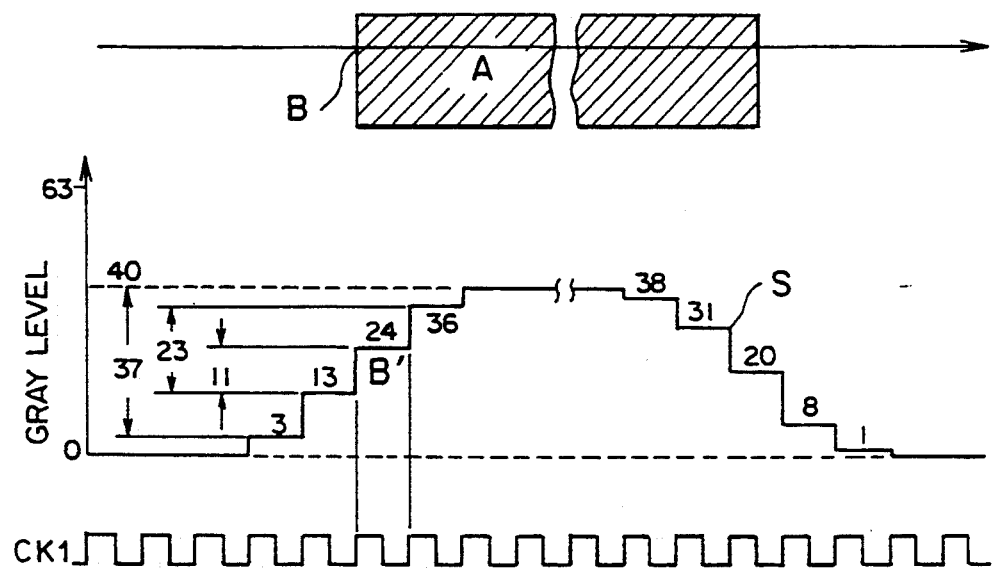
FIG. 26 is a diagram for explaining an edge detection process performed by the edge detecting part of FIG. 25.

FIG. 26 shows the edge detection process performed by the edge detecting part 123 of FIG. 25. In FIG. 26, a shaded area A represents a halftone image on white background, an arrow crossing the shaded area A indicates a main scanning line along which the halftone image is scanned by the scanner, and a point B indicates a front-side edge of the halftone image which should be detected when scanned along the main scanning line. The input image data S supplied by the scanner to the edge detecting part is represented according to the gray level of each pixel of the input image data S as in a chart shown in FIG. 26. Each pixel of the input image corresponds to the state indicated by the clock signal CK1. The subject pixel of the input image data S corresponding to the edge B of the input image A is indicated by a letter B' in the chart of FIG. 26. In the case of the conventional edge detection device, a difference in gray level between two adjacent pixels of input image data is detected, and in the present case a gray level difference which is equal to 11 is obtained from the gray levels of two adjacent pixels at the point B' shown in FIG. 26. However, according to the present invention, the gray level difference indicated by the signal S8 is equal to 23 if the select signal ES is set to the state indicating the value "0" (S8=S4−S2), or equal to 37 if the select signal ES is set to the state indicating the value "1" (S8=S5−S1). Therefore, according to the present invention, it is possible to accurately detect the edge of the input image because the pixel value difference has a level great enough to be correctly detected by the edge detecting part.

Figure 27:
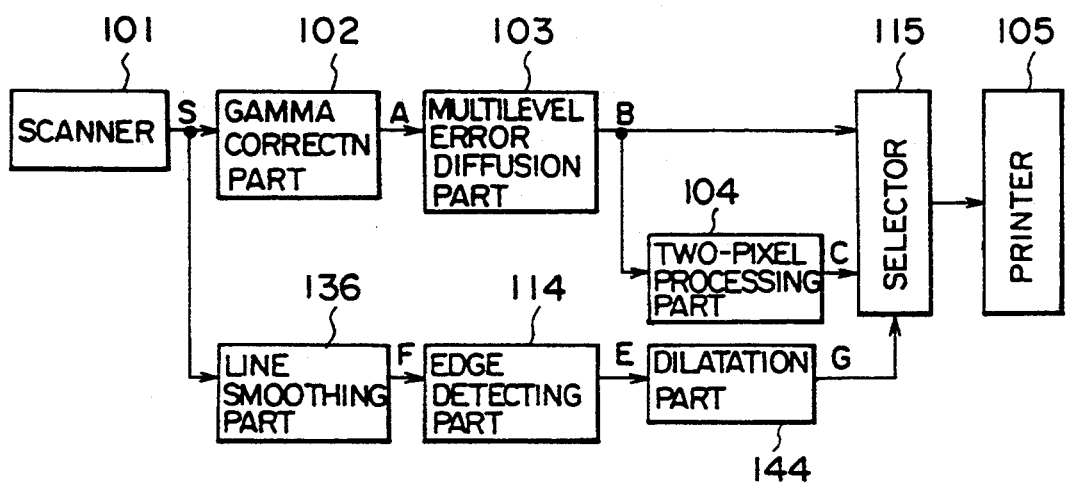
FIG. 27 is a block diagram showing a third embodiment of the image processing apparatus of the present invention.

Next, a description will be given of a third embodiment of the present invention, with reference to FIGS. 27 through 29. In FIG. 27, the parts of the image processing apparatus which are the same as those corresponding parts of the apparatus of FIG. 23 are designated by the same reference numerals, and a description thereof being omitted. FIG. 27 shows the third embodiment of the image processing apparatus, and this image processing apparatus further includes a line smoothing part 136 between the scanner 101 and the edge detecting part 114, and a dilatation part 144 between the edge detecting part 114 and the selector 115.

Figure 28:
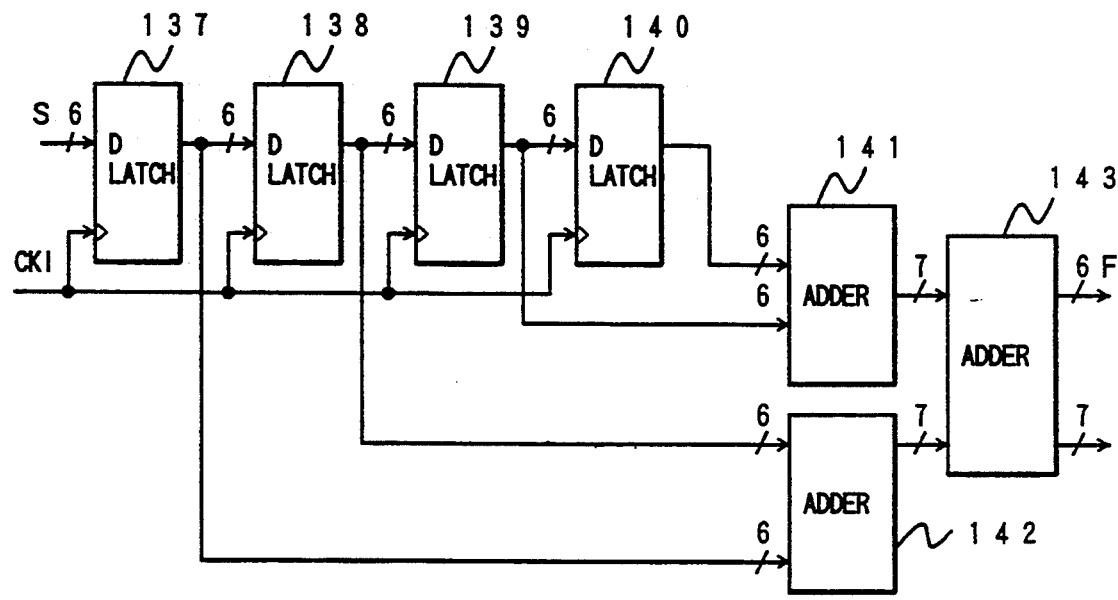
FIG. 28 is a diagram showing a line smoothing part of the image processing apparatus of FIG. 27.

FIG. 28 shows the construction of the line smoothing part of the apparatus of FIG. 27. The line smoothing part performs a line smoothing process in which aliasing is removed from a number of successive pixels of the input image, supplied by the scanner to the line smoothing part, so as to produce an output image having a smooth line. More specifically, this line smoothing process is carried by the line smoothing part 136 of FIG. 28 by obtaining an average value from values of four successive pixels of the input image in a main scanning line.

In FIG. 28, the line smoothing part 136 includes four latch circuits 137 through 140, and three adders 141 through 143. Four successive pixels of the input image S output by the scanner 101 are input to this part 136, and they are temporarily stored in the latch circuits 137 through 140 in synchronism with the clock signals CK1 supplied to the latch circuits. For the sake of convenience, it is assumed in this embodiment that each pixel of the input image indicated by a 6-bit image signal is supplied. The circuits 137 through 140 simultaneously output such four pixel values to the two adders 141 and 142; first and second pixel values S1 and S2 being output to the adder 141, and at the same time third and fourth pixel values S3 and S4 being output to the adder 142. After the two pixel values are received, the adder 141 outputs a signal to the adder 143, this signal indicating a value "S1 +S2" of the sum of the two pixel values, and at the same time the adder 142 outputs a signal to the adder 143, this signal indicating a value "S3+S4" of the sum of the two pixel values. The adder 143 outputs a signal indicating a value of the sum of the four pixel values. A signal F having six higher-order bits of the signal output by the adder 143 is output to the edge detecting part 114. This signal F indicates an average value obtained from the values of the four successive pixels of the input image. After the signal F is received from the part 136, the edge detecting part 114 carries out the above described edge detection process.

Figure 29:
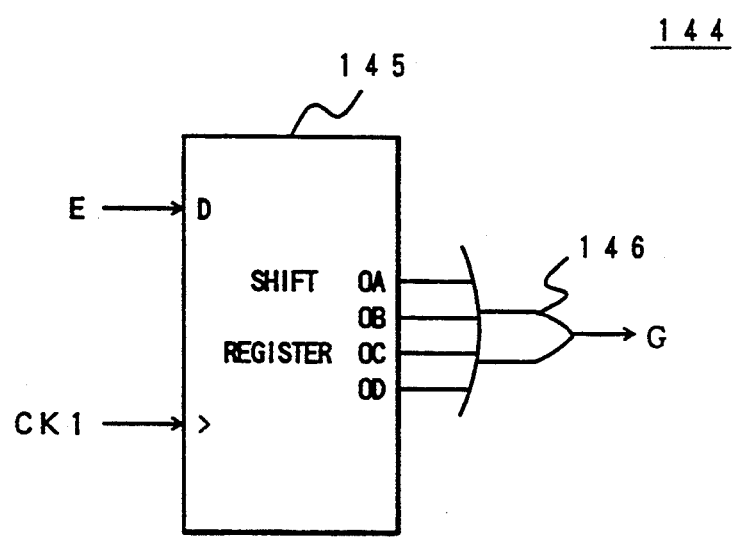
FIG. 29 is a diagram showing a dilatation part of the image processing apparatus of FIG. 27.

FIG. 29 shows the construction of the dilatation part of the image processing apparatus of FIG. 27. This dilatation part 144 of FIG. 29 includes a shift register 145 and an OR gate 146, and is provided so as to output a signal G having high level "H" to the selector 115 for a longer time period if the edge detection signal (the signal E with high level "H") is received from the edge detecting part 114.

In FIG. 29, the shift register 145 receives four successive pixels of the input image and temporarily stores them, in synchronism with the clock signal CK1 supplied to the shift register 145. Four signals indicating values of such four pixels are input to the OR gate 146, and this OR gate 146 outputs a signal G at high level "H" to the selector 115 if there is at least one edge detection signal (the signal E at high level "H") among the four signals received from the shaft register 145. In accordance with the level of the signal G being received, the selector 115 performs the above described image signal selection process, so that an appropriate signal of an output image is supplied to the printer 105. More specifically, the selector 115 selects the image signal B supplied by the part 103 if no edge detection signal is received, and if one edge detection signal is received the selector 115 selects the image signal C supplied by the part 104 for a time period needed to supply a plurality of neighborhood pixels adjacent to the pixel actually indicating the edge of the input image. This time period is longer than a time period needed to supply two successive pixels in the input image.

According to the third embodiment, when the edge detection signal is received, the selector 115 outputs the image signal ID1, supplied by the part 103, to the printer 105. On the other hand, when it is detected by the edge detecting part 114 that a pixel of the input image data is not an edge of the input image, the edge detecting part 114 outputs a signal with a low level "L" to the selector 115. When the low-level signal is received from the part 114, the selector 115 outputs the image signal ID2, supplied by the two-pixel processing part 104, to the printer 105. In other words, in accordance with the level of the signal supplied by the edge detecting part 114, the selector 115 selects either the signal B supplied by the part 103 or the signal C supplied by the part 104 so as to output the signal D indicating appropriate output image data to the printer 105. If the pixel of the input image does not represent an edge of the input image, the output image data after the above described two-pixel process is performed is supplied to the printer 105. If the pixel of the input image represents an edge of the input image, the output image data supplied by the multilevel error diffusion part 103 with no two-pixel process being performed is supplied to the printer 105.

Figure 30:
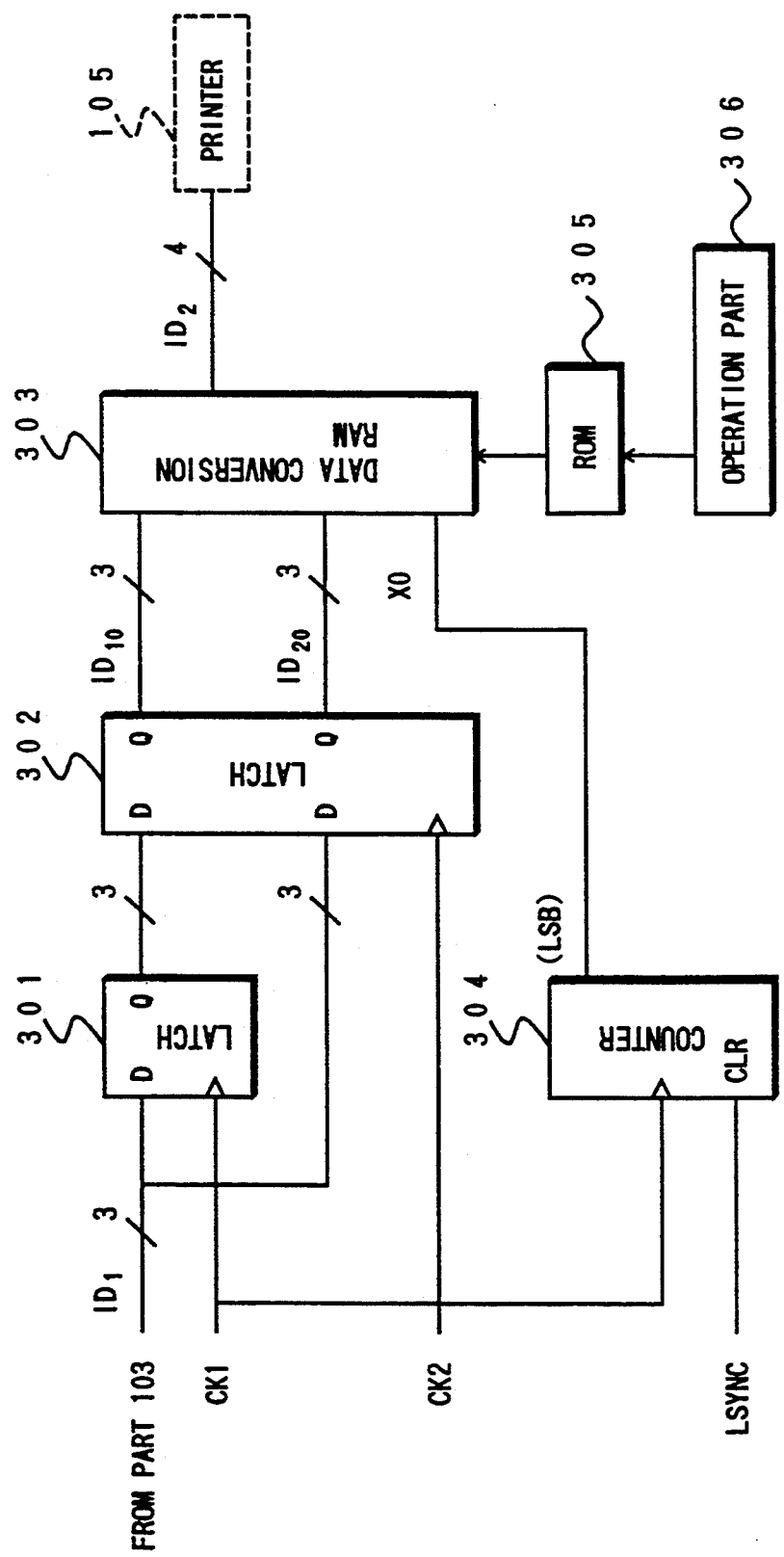
FIG. 30 is a block diagram showing a modified two-pixel processing part of the image processing apparatus according to the present invention.

FIG. 30 shows a modified two-pixel processing part 104 of the image processing apparatus. In FIG. 30, this two-pixel processing part 104 further includes a read only memory ROM 305 and an operation part 306. In this two-pixel processing part 104, unless a special command is manually given by a user from the operation part 306, the data conversion memory RAM 303 converts each of the image data including the two successive pixel data ID10 and ID20 into image data ID2 in accordance with the data conversion table (50 allotment data conversion) in the RAM 303. In a normal operation mode of this modified embodiment (when no special command is given), the data conversion table in which the data conversion is represented by the formula (1) (50% allotment data conversion) is transferred from the ROM 305 to the RAM 303. However, if a special command of 100% allotment data conversion is manually given by the user from the operation part 306, another data conversion table (100% allotment data conversion) pre-recorded in the ROM 305 is transferred to the RAM 303. Such a data conversion is performed with the data conversion table in the RAM 303 by the two-pixel processing part 104. Also, a 25% allotment data conversion table and a 75% allotment data conversion table are pre-recorded in the ROM 305. Thus, if a corresponding special command is entered by the user from the operation part 306, the two-pixel processing part 104 performs the corresponding data conversion (one of 25%, 50%, 75% and 100% allotment data conversion) with the corresponding data conversion table transferred to the RAM 303 from the ROM 305.

Further, the present invention is not limited to the above described embodiments, and variations and modifications may be made without departing from the scope of the present invention.

What is claimed is:

1. An image processing apparatus comprising:
  a scanner for inputting image data indicative of an image with a multilevel tone;
  multilevel data means for generating multilevel tone data from said input image data using a prescribed error diffusion process, said multilevel data means including means for outputting image data having pixels to which said multilevel tone data is assigned;
  storage means for temporarily storing a value of one of two successive pixels included in said image data output by said multilevel data means;
  two-pixel processing means for converting said value of said one pixel stored in said storage means into a first value, and for generating second values of said two successive pixels using said first value of said the pixel, so that output image data is output to a printer; and
  control means for adjusting an exposure time of the printer in accordance with predetermined characteristic relationship between the exposure time and a dot intensity, thus allowing a value of intensity of each dot of the output image output to the printer to be proportional to an intensity of said two successive pixels supplied by said multilevel data means;

wherein each pixel of said output image data is described by said second values of said two successive pixels generated by said two-pixel processing means.

2. An image processing apparatus according to claim 1, wherein said multilevel data means includes a memory for storing a data conversion table, said data conversion table defining each said multilevel tone data in accordance with an address value corresponding to a value of each pixel of said input image data input by said scanner.

3. An image processing apparatus according to claim 1, further comprising error data means for adding a weighted error data to each pixel of said input image data, said weighted error data corresponding to a difference between a value of each said pixel and a predetermined threshold value.

4. An image processing apparatus according to claim 3, wherein said multilevel data means includes a memory for storing a data conversion table, said weighted error data being defined in said data conversion table stored in said memory in accordance with a difference between a value of each said pixel of said input image data and a predetermined threshold value.

5. An image processing apparatus according to claim 1, further comprising edge detection means for detecting whether or not a pixel of said image data supplied by said scanner is an edge of an input image, and selection means for selectively outputting said output image data of said two-pixel processing means to the printer or outputting said image data of said multilevel data means to the printer, in accordance with said pixel of said image data being detected by said edge detection means.

6. An image processing apparatus according to claim 5, wherein said selection means outputs said output image data of said two-pixel processing means to the printer when said edge detection means detects that said pixel of said image data is not an edge of the input image, and said selection means outputting said image data of said multilevel data means to the printer when said edge detection means detects that said pixel of said image data is an edge of the input image.

7. An image processing apparatus according to claim 5, further comprising line smoothing means for supplying image data having pixels indicating a smooth line to said edge detection means, said pixels of said image data being generated by obtaining an average value from values of a given number of successive pixels of said input image data in a main scanning line of said scanner.

8. An image processing apparatus comprising
a scanner for inputting image data indicative of an image with a multilevel tone:
multilevel data means for generating multilevel tone data from said input image data using a prescribed error diffusion process, said multilevel data means including means for outputting image data having pixels to which said multilevel tone data is assigned;
storage means for temporarily storing a value of one of two successive pixels included in said image data output by said multilevel data means;
two-pixel processing means for converting said value of said one pixel stored in said storage means into a first value, and for generating second values of said two successive pixels using said first value Of said one pixel, so that output image data is output to a printer;

control means for adjusting an exposure time of the printer in accordance with predetermined characteristic relationship between the exposure time and a dot intensity, thus allowing a value of intensity of each dot of the output image output to the printer is proportional to an intensity of said two successive pixels supplied by said multilevel data means; and
error data means for adding a weighted error data to each pixel of said input image data, said weighted error data corresponding to a difference between a value of each said pixel and a predetermined threshold value;
wherein:
each pixel of said output image data is described by said second values of said two successive pixels generated by said two-pixel processing means;
said multilevel data means includes a memory for storing a data conversion table, said weighted error data being defined in said data conversion table stored in said memory in accordance with a difference between a value of each said pixel of said input image data and a predetermined threshold value; and
said control means includes a memory means for temporarily storing a value of a preceding pixel of said two successive pixels, allowing said control means to convert each value of said multilevel tone data into an image data value by every two pixel data in accordance with said data conversion table stored in said memory.

9. The apparatus according to claim 8, wherein said two-pixel processing means carries out a two-pixel process in which a value being converted from a preceding pixel of said two successive pixels is greater than a value converted from a following pixel of said two successive pixels.

10. An image processing apparatus comprising:
a scanner for inputting image data indicative of an image with a multilevel tone;
multilevel data means for generating multilevel tone data from said input image data using a prescribed error diffusion process, said multilevel data means including means for outputting image data having pixels to which said multilevel tone data is assigned;
storage means for temporarily storing a value of one of two successive pixels included in said image data output by said multilevel data means:
two-pixel processing means for converting said value of said one pixel stored in said storage means into a first value, and for generating second values of said two successive pixels using said first value of said one pixel, so that output image data is output to a printer; and
edge detection means for detecting whether or not a pixel of said image data supplied by said scanner is an edge of an input image, and selection means for selectively outputting said output image data of said two-pixel processing means to the printer, in accordance with said pixel of said image data being detected by said edge detection means;
wherein:
each pixel of said output image data is described by said second values of said two successive pixels generated by said two-pixel processing means; and said edge detection means includes means for detecting a front-side edge of the input image with relation to a main scanning line of said scanner.

11. An image processing apparatus according to claim 10, further comprising dilatation means for outputting a signal at high level to said selection means for a first time period when said edge detection means detects that said given number of said successive pixels include an edge of the input image, said first time period needed to supply values of said successive pixels of said input image data to said selection means being longer than a time period needed to supply values of two successive pixels of said input image data to said selection means.

12. An image processing apparatus comprising:
a scanner for inputting image data indicative of an image with a multilevel tone;
multilevel data means for generating multilevel tone data from said input image data using a prescribed error diffusion process, said multilevel data means including means for outputting image data having pixels to which said multilevel tone data is assigned;
storage means for temporarily storing a value of one of two successive pixels included in said image data output by said multilevel data means;
two-pixel processing means for converting said value of said one pixel stored in said storage means into a first value, and for generating second values of said two successive pixels using said first value of said one pixel, so that output image data is output to a printer; and
edge detection means for detecting whether or not a pixel of said image data supplied by said scanner is an edge of an input image, and selection means for selectively outputting said output image data of said two pixel processing means to the printer, in accordance with said pixel of said image data being detected by said edge detection means;
wherein:
each pixel of said output image data is described by said second values of said two successive pixels generated by said two-pixel processing means; and
said edge detection means includes a gray-level difference detecting part for detecting a difference in gray level between two values of preceding and following pixels spaced apart by a prescribed distance along a main scanning line, said preceding and following pixels being selected from among a given number of successive pixels of the input image data in the main scanning line, said edge detection means thus detecting whether or not a pixel of said input image data is an edge of the input image in accordance with said gray level difference detected by said gray-level difference detecting part.

13. An image processing apparatus comprising:
a scanner for inputting image data indicative of an image with a multilevel tone;
multilevel data means for generating multilevel tone data from said input image data using a prescribed error diffusion process, said multilevel data means including means for outputting image data having pixels to which said multilevel tone data is assigned;
storage means for temporarily storing a value of one of two successive pixels included in said image data output by said multilevel data means;
two-pixel processing means for converting said value of said one pixel stored in said storage means into a first value, and for generating second values of said two successive pixels using said first value of said one pixel, so that output image data is output to a printer;
edge detection means for detecting whether or not a pixel of said image data supplied by said scanner is an edge of an input image, and selection means for selectively outputting said output image data of said two-pixel processing means to the printer, in accordance with said pixel of said image data being detected by said edge detection means; and
line smoothing means for supplying image data having pixels indicating a smooth line to said edge detection means, said pixels of said image data being generated by obtaining an average value from values of a given number of successive pixels of said input image data in a main scanning line of said scanner;
wherein:
each pixel of said output image data is described by said second values of said two successive pixels generated by said two-pixel processing means; and
said selection means includes means for outputting said output image data of said two-pixel processing means to the printer when said edge detection means detects that said given number of said successive pixels do not include an edge of the input image, and for outputting said image data of said multilevel data means to the printer when said edge detection means detects that said given number of said successive pixels include an edge of the input image.

14. An image processing apparatus comprising:
a scanner for inputting image data indicative of an image with a multilevel tone;
multilevel data means for generating multilevel tone data from said input image data using a prescribed error diffusion process, said multilevel data means including means for outputting image data having pixels to which said multilevel tone data is assigned;
storage means for temporarily storing a value of one of two successive pixels included in said image data output by said multilevel data means; and
two-pixel processing means for converting said value of said one pixel stored in said storage means into a first value, and for generating second values of said two successive pixels using said first value of said one pixel, so that output image data is output to a printer;
wherein:
each pixel of said output image data is described by said second values of said two successive pixels generated by said two-pixel processing means; and
when said output image data is supplied by said two-pixel processing means to said printer, an output image having pixels to which multilevel tone data described with "N"gray levels is assigned to be printed out by said printer.

15. An image processing apparatus comprising:
a scanner for inputting image data indicative image with a multilevel tone;
multilevel data means for generating multilevel tone data from said input image data using a prescribed error diffusion process, said multilevel data means including means for outputting image data having pixels to which said multilevel tone data is assigned;

storage means for temporarily storing a value of one of two successive pixels included in said image data output said multilevel data means; and two-pixel processing means for converting said value of said one pixel stored in said storage means into a first value, and for generating second values of said two successive pixels using said first value of said one pixel, so that output image data is output to a printer;

wherein:

each pixel of said output image data is described by said second values of said two successive pixels generated said two-pixel processing means; and when said first value of said one pixel is equal to 50 percent of said value of said one pixel stored in said storage means, said second values of said two successive pixels are generated by said two-pixel processing means using said first value.

* * * * *